(12) United States Patent
Noda et al.

(10) Patent No.: US 9,726,863 B2
(45) Date of Patent: Aug. 8, 2017

(54) WIDE ANGLE ZOOM LENS

(71) Applicant: TAMRON CO., LTD., Saitama-shi, Saitama (JP)

(72) Inventors: Takayuki Noda, Saitama (JP); Takahiro Mitsuhashi, Saitama (JP); Seigou Nakai, Saitama (JP)

(73) Assignee: TAMRON CO., LTD., Saitama-shi (JP)

( * ) Notice: Subject to any disclaimer, the term of this patent is extended or adjusted under 35 U.S.C. 154(b) by 0 days.

(21) Appl. No.: 14/830,011

(22) Filed: Aug. 19, 2015

(65) Prior Publication Data

US 2016/0124181 A1    May 5, 2016

(30) Foreign Application Priority Data

Oct. 31, 2014  (JP) .................................. 2014-223556

(51) Int. Cl.
*G02B 15/177* (2006.01)
*G02B 13/00* (2006.01)
*G02B 27/00* (2006.01)

(52) U.S. Cl.
CPC ......... *G02B 13/009* (2013.01); *G02B 13/006* (2013.01); *G02B 15/177* (2013.01); *G02B 27/0025* (2013.01)

(58) Field of Classification Search
CPC ........ G02B 15/00; G02B 15/02; G02B 15/04; G02B 15/14; G02B 15/15; G02B 15/155; G02B 15/16; G02B 15/161; G02B 15/163; G02B 15/167; G02B 15/177; G02B 15/20; G02B 13/00; G02B 13/001; G02B 13/009; G02B 13/02

USPC ....... 359/362, 363, 380, 379, 504, 642, 645, 359/648, 672, 676, 680, 683, 684, 685, 359/689
See application file for complete search history.

(56) References Cited

U.S. PATENT DOCUMENTS

2006/0056047 A1* 3/2006 Oshita .................. G02B 15/177
   359/680
2015/0042846 A1* 2/2015 Shimomura ........... G02B 15/20
   348/240.3

FOREIGN PATENT DOCUMENTS

| JP | 2009-103790 A | 5/2009 |
| JP | 2009-271165 A | 11/2009 |
| JP | 2012-194238 A | 10/2012 |

* cited by examiner

*Primary Examiner* — Ricky Mack
*Assistant Examiner* — Robert E Tallman
(74) *Attorney, Agent, or Firm* — Foley & Lardner LLP

(57) ABSTRACT

A wide angle zoom lens includes sequentially from the object side, a first lens group having a negative refractive power overall and three lenses, including first to third lenses, having a negative refractive power and disposed farthest on the object side; a second lens group having a positive refractive power overall and one or more sets of cemented lenses; and a third lens group having a negative refractive power. This ultra wide angle zoom lens varies intervals between the first lens group, the second lens group, and the third lens group on the optical axis to zoom from the wide angle end to the telephoto end and satisfies given conditions to thereby enable a high zoom ratio, large diameter, and high resolution.

11 Claims, 10 Drawing Sheets

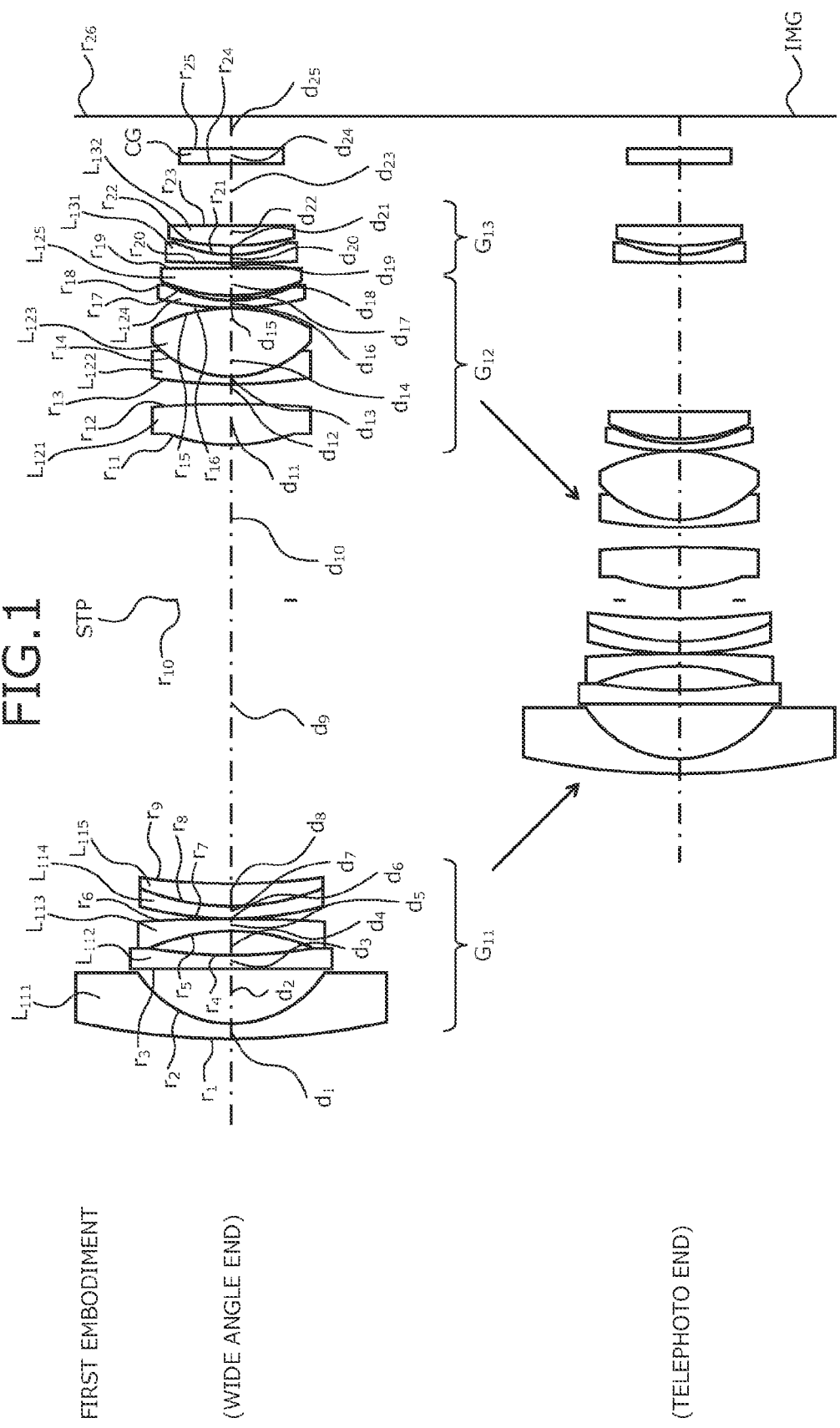

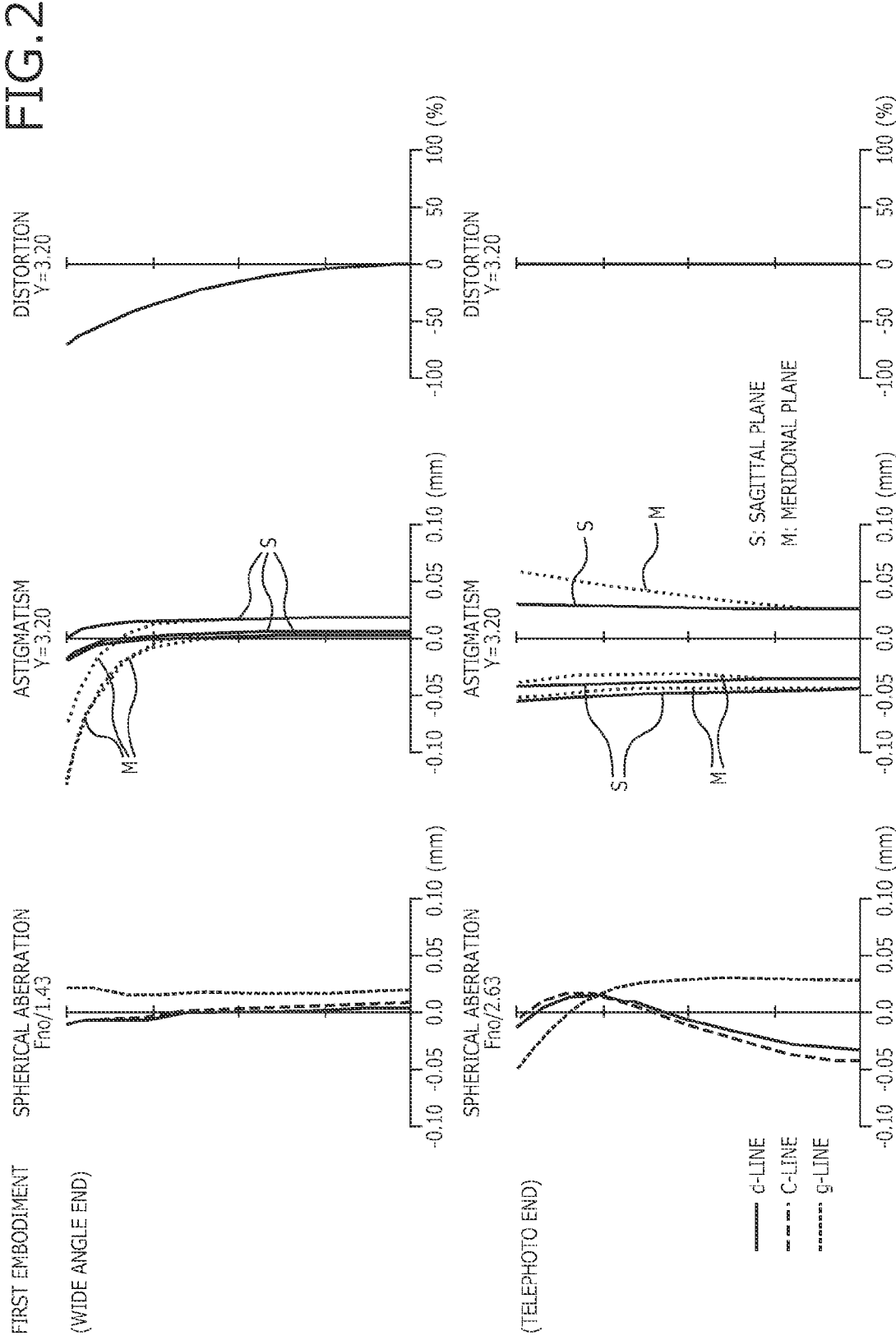

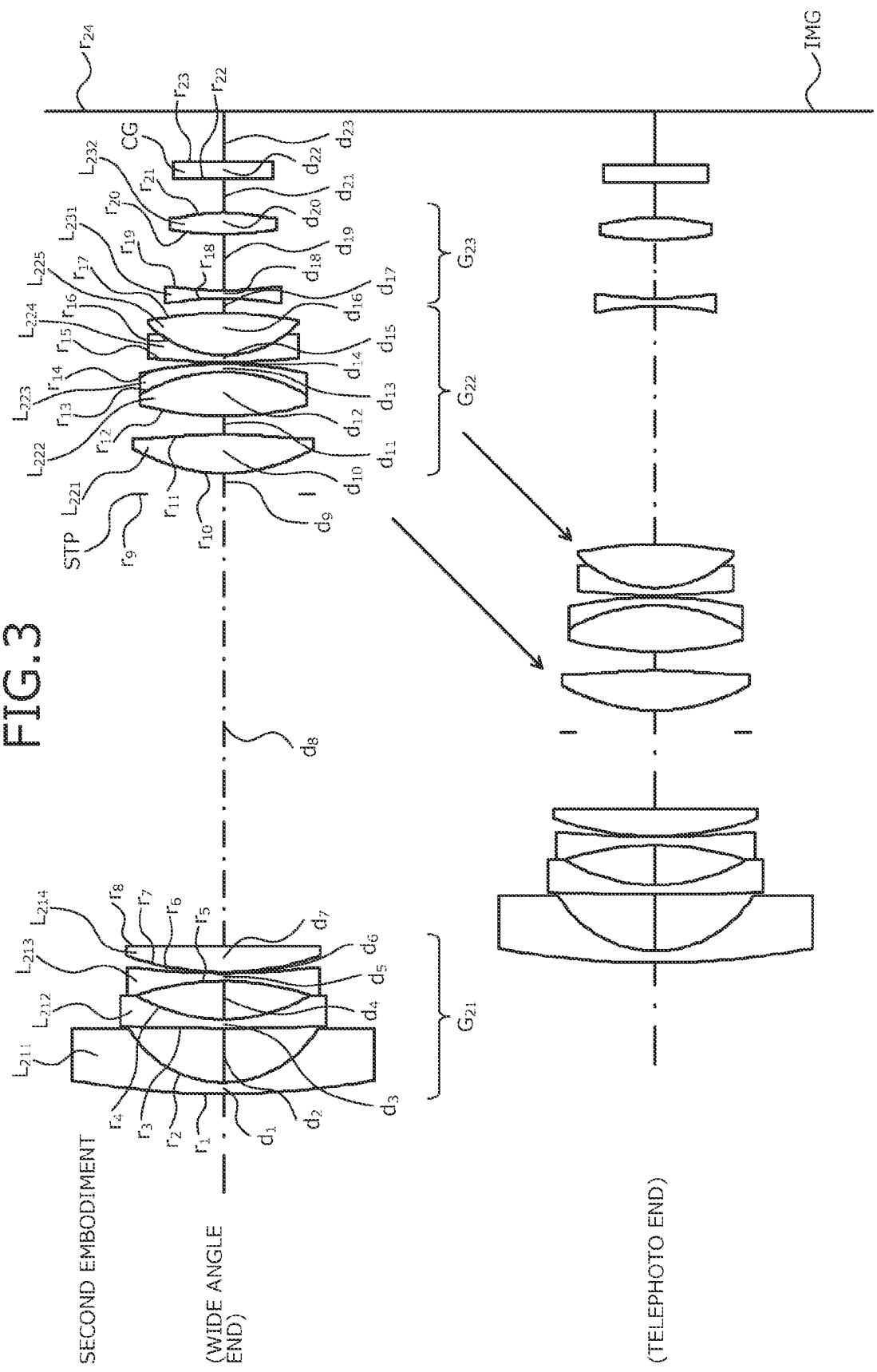

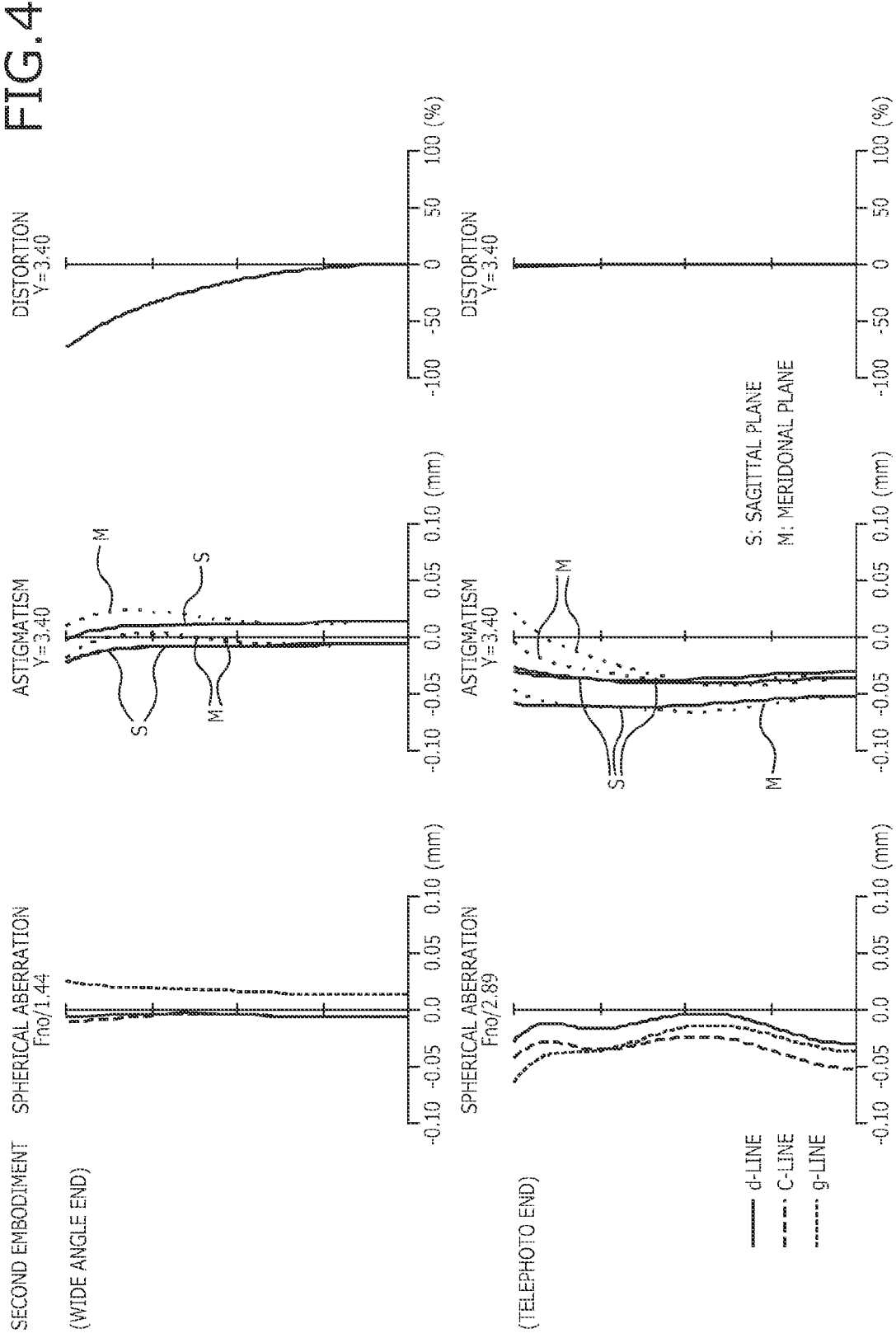

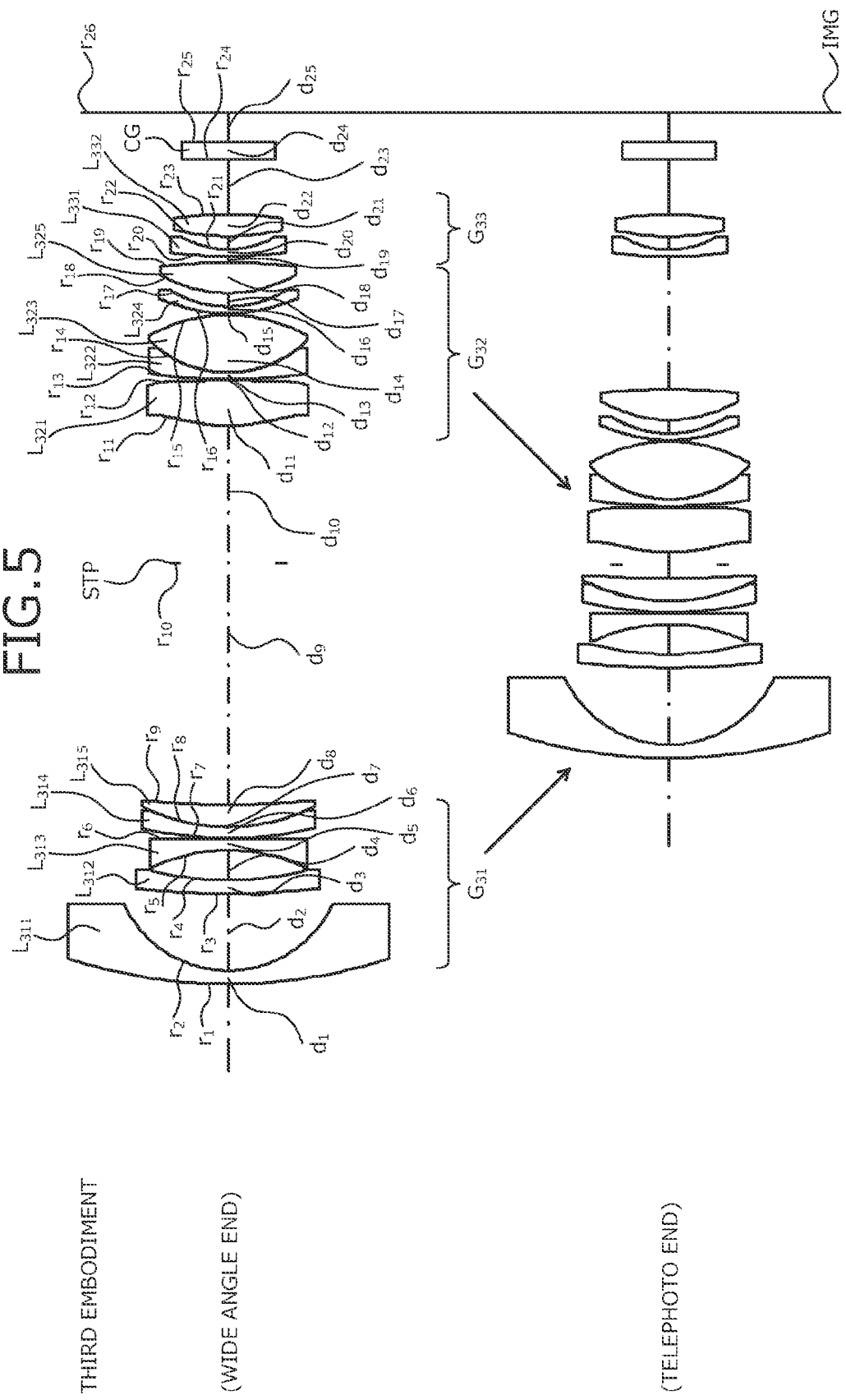

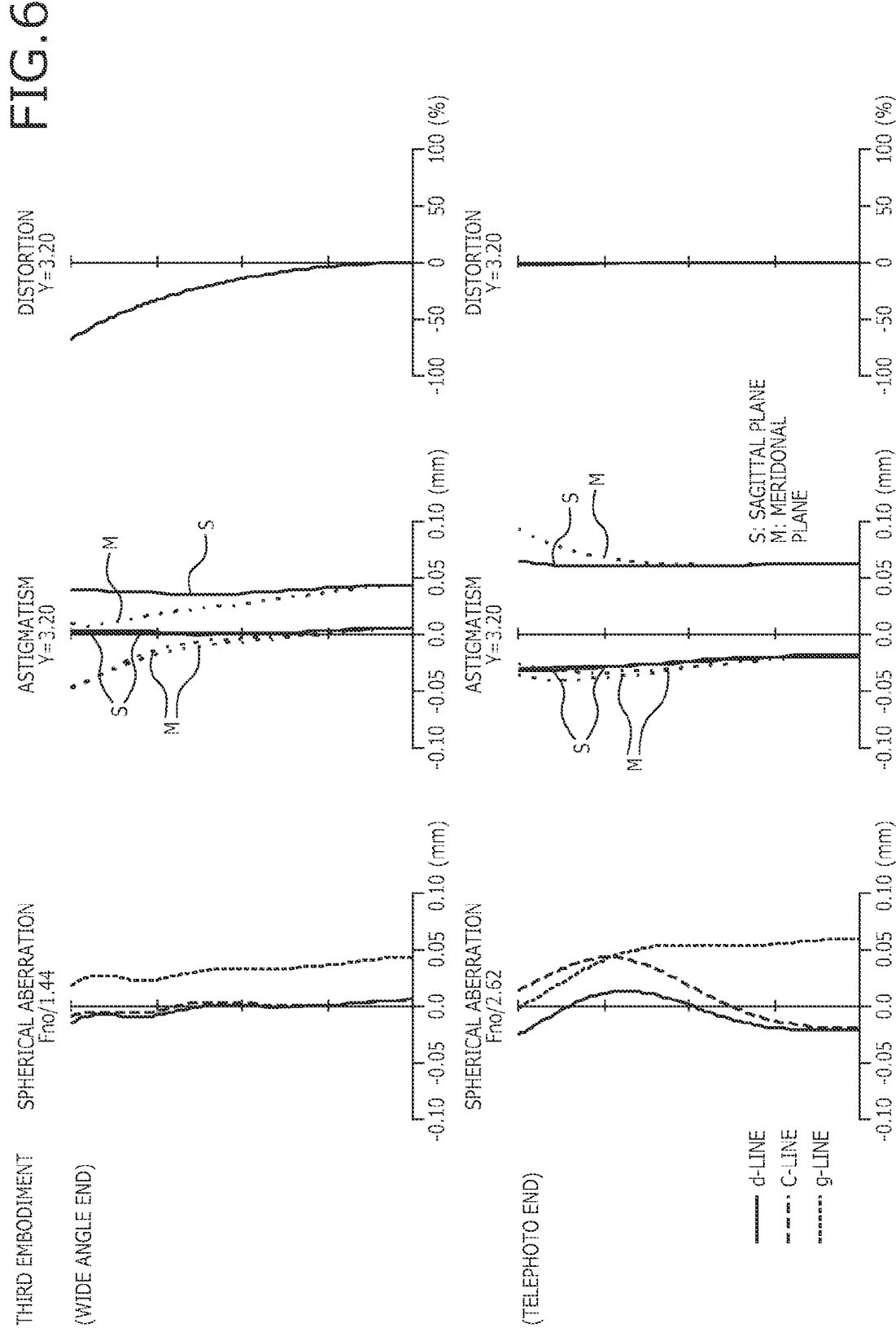

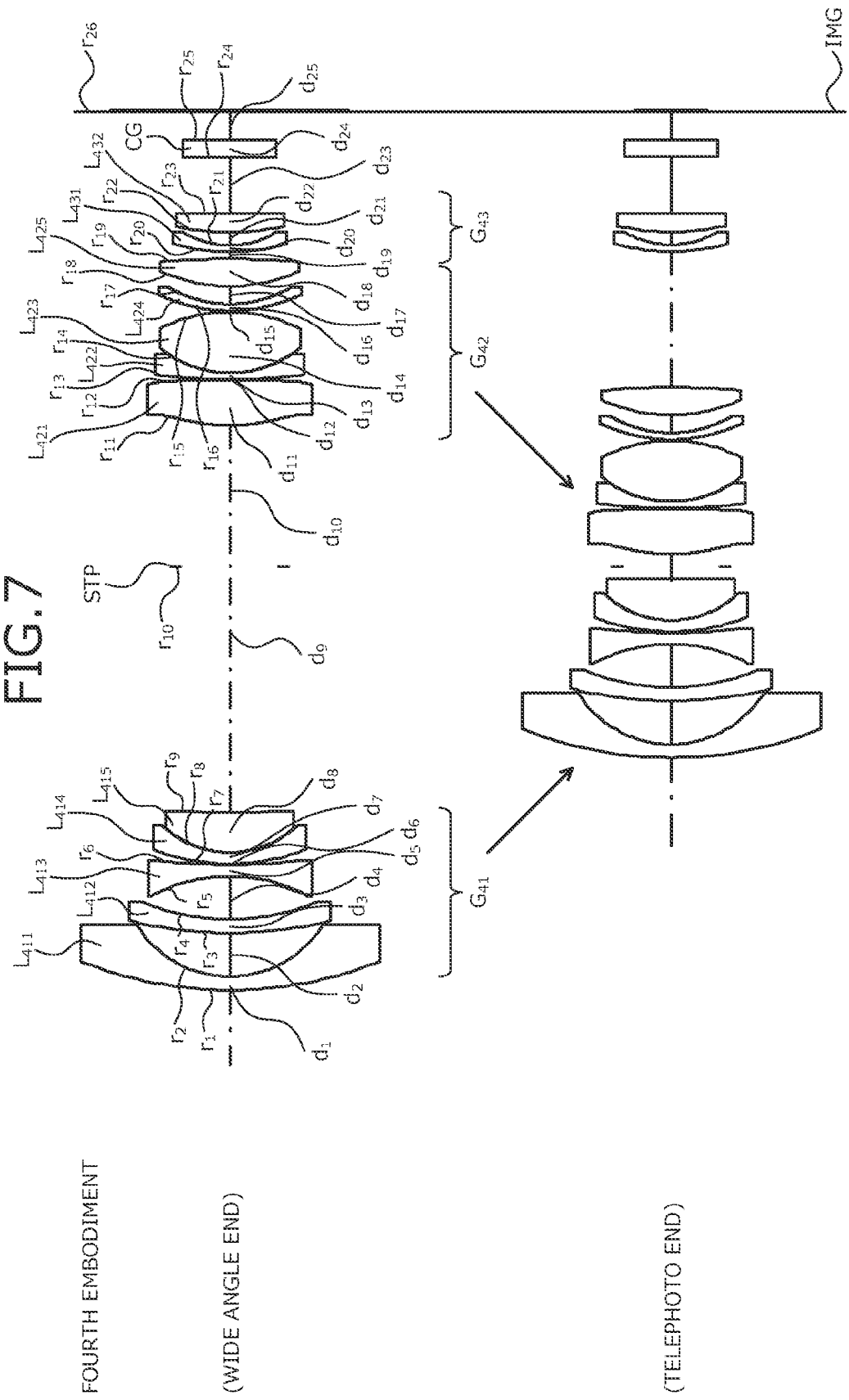

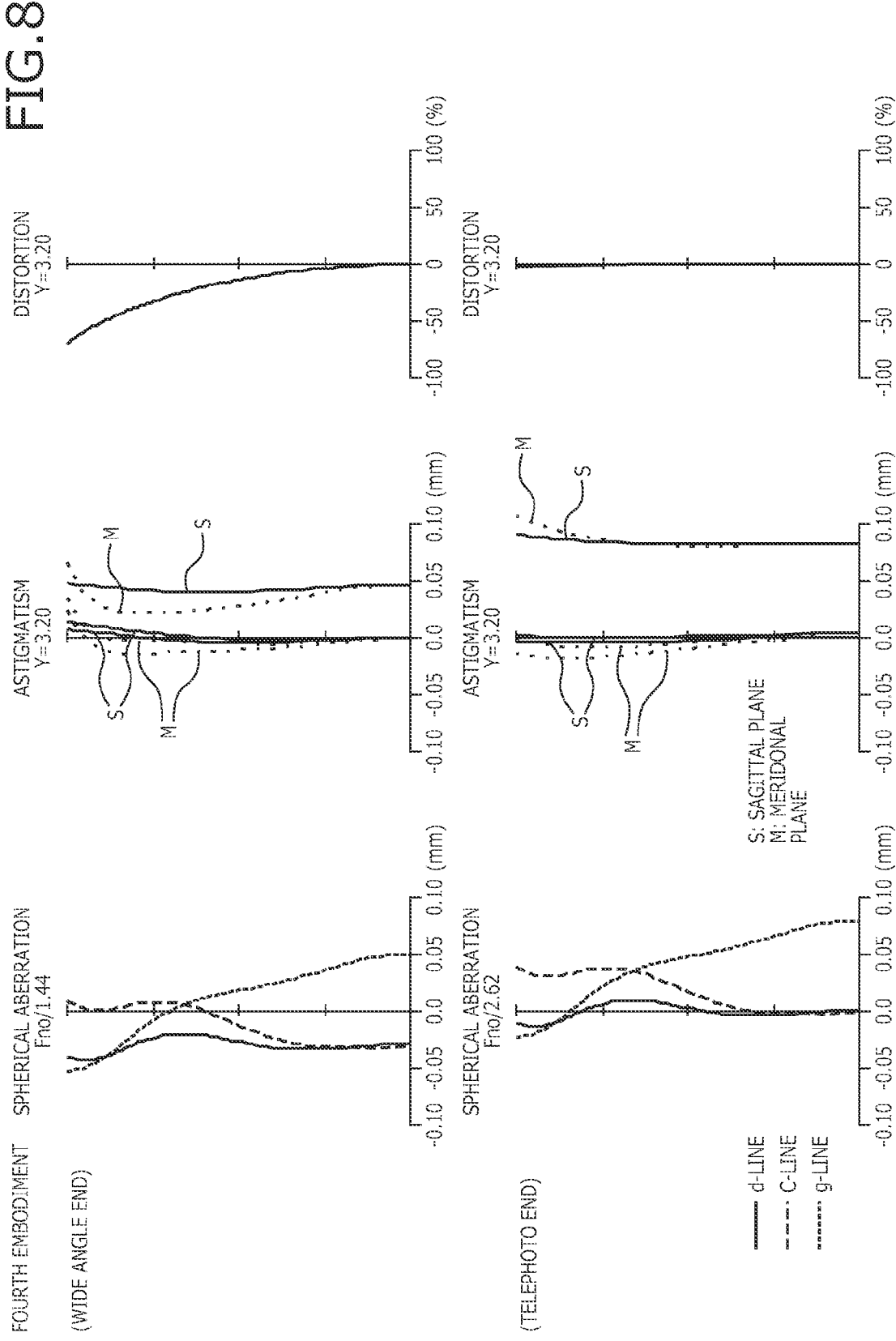

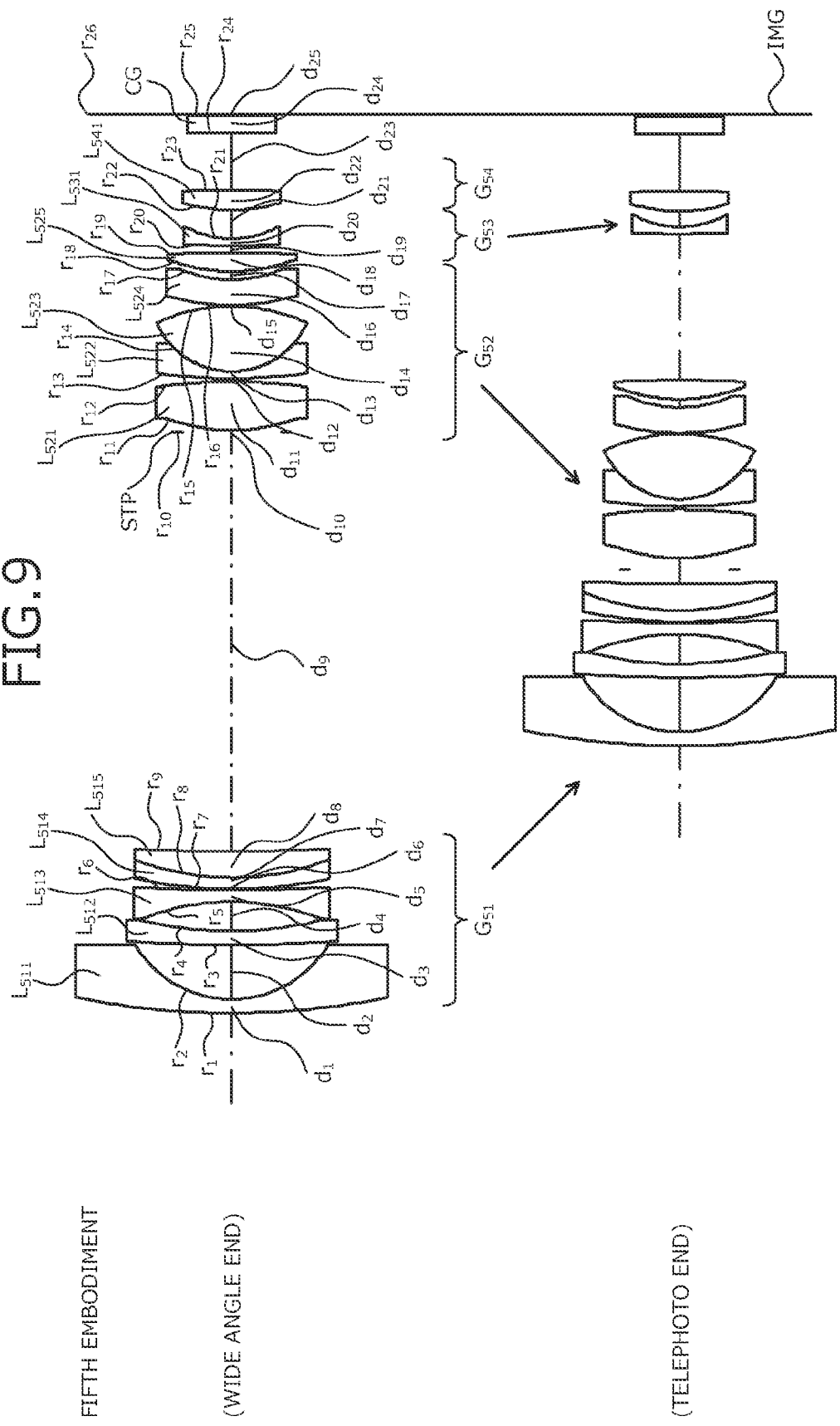

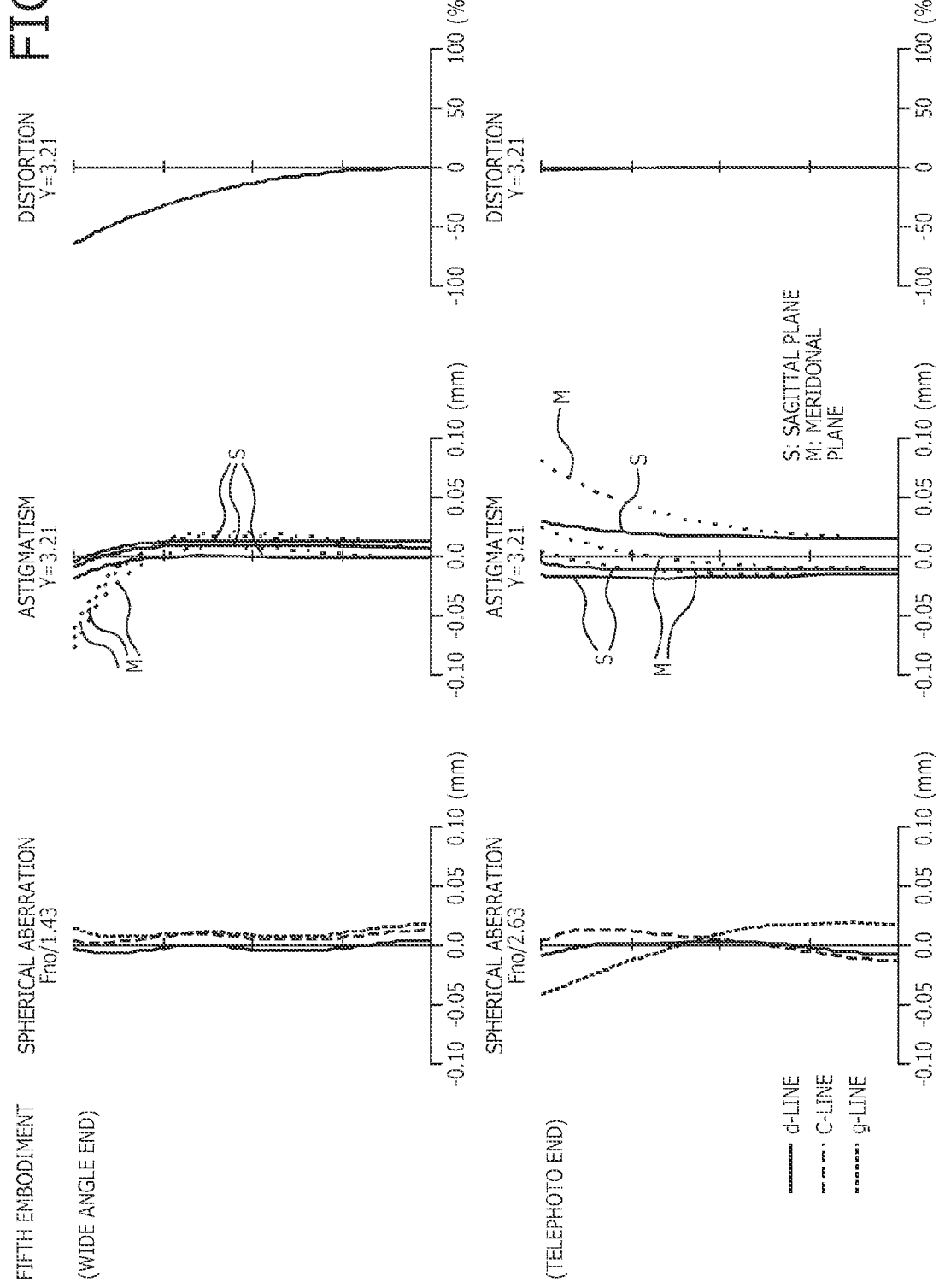

WIDE ANGLE ZOOM LENS

BACKGROUND OF THE INVENTION

1. Field of the Invention

The present invention relates to a wide angle zoom lens.

2. Description of the Related Art

Numerous wide angle zoom lenses that can be used on imaging apparatuses equipped with a solid-state image sensing device such as a CCD, C-MOS, and the like have been proposed (for example, refer to Japanese Patent Laid-Open Publication Nos. 2012-194238, 2009-271165, and 2009-103790).

There is a growing need among web cameras, monitor cameras, video cameras, etc., for zoom lenses that can capture wide angle images with high sensitivity. To reduce crime and to record highly reliable evidence, in the field of surveillance cameras as well, there is a growing need for zoom lenses that have a simple configuration and that can capture bright wide-angle images in not only the visible light region but also in the near-infrared light region. Consequent to the increasingly smaller size of imaging apparatuses further size reductions are also demanded of zoom lenses.

Nonetheless, with convention technologies such as the optical systems disclosed in the patent documents above, a zoom lens satisfying recent needs has yet to be realized.

For example, the optical system disclosed in Japanese Patent Laid-Open Publication No. 2012-194238 has a wide angle focal length to telephoto focal length ratio (zoom ratio) on the order of 5 to 9 and can favorably correct variations in aberration during zooming. Nonetheless, with an F number on the order of 2.1 to 2.7, the optical system is a dark lens. The optical systems disclosed in Japanese Patent Laid-Open Publication Nos. 2009-271165, and 2009-103790 are respectively bright, having an F number on the order of 1.5 and also favorably correct variations in aberration during zooming. Nonetheless, the zoom ratio is small, on the order of 1.5. Thus, it is difficult to say that the optical systems disclosed in the patent documents above achieve reductions in the overall length of the optical system to an extent satisfying recent needs.

SUMMARY OF THE INVENTION

It is an object of the present invention to at least solve the above problems in the conventional technologies.

A wide angle zoom lens includes sequentially from an object side a first lens group having a negative refractive power overall and three lenses, including a first lens, a second lens, and a third lens, successively disposed farthest on the object side and having a negative refractive power; a second lens group having a positive refractive power overall and one or more sets of cemented lenses; and a third lens group. The wide angle zoom lens zooms from a wide angle end to a telephoto end by varying intervals between the first lens group, the second lens group, and the third lens group on the optical axis. The wide angle zoom lens satisfies a conditional expression (1) $70 \leq \upsilon max2a \leq 99$ and a conditional expression (2) $70 \leq \upsilon maxg23 \leq 99$, where $\upsilon max2a$ represents an Abbe number of a lens that among the one or more sets of cemented lenses included in the second lens group, has least dispersion, and $\upsilon maxg23$ represents an Abbe number of a lens that among the second lens and the third lens included in the first lens group, has lesser dispersion.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a diagram depicting, along an optical axis, a configuration of a wide angle zoom lens according to a first embodiment;

FIG. 2 is a diagram of various types of aberration occurring in the wide angle zoom lens according to the first embodiment;

FIG. 3 is a diagram depicting, along the optical axis, a configuration of the wide angle zoom lens according to a second embodiment;

FIG. 4 is a diagram of various types of aberration occurring in the wide angle zoom lens according to the second embodiment;

FIG. 5 is a diagram depicting, along the optical axis, a configuration of the wide angle zoom lens according to a third embodiment;

FIG. 6 is a diagram of various types of aberration occurring in the wide angle zoom lens according to the third embodiment;

FIG. 7 is a diagram depicting, along the optical axis, a configuration of the wide angle zoom lens according to a fourth embodiment;

FIG. 8 is a diagram of various types of aberration occurring in the wide angle zoom lens according to the fourth embodiment;

FIG. 9 is a diagram depicting, along the optical axis, a configuration of the wide angle zoom lens according to a fifth embodiment; and FIG. 10 is a diagram of various types of aberration occurring in the wide angle zoom lens according to the fifth embodiment.

DETAILED DESCRIPTION OF THE PREFERRED EMBODIMENTS

Preferred embodiments of a wide angle zoom lens according to the present invention will be described in detail with reference to the accompanying drawings.

The wide angle zoom lens according to the present invention is configured to include sequentially from the object side, a first lens group having a negative refractive power overall and three lenses, including first to third lenses, successively disposed farthest on the object side and having a negative refractive power; a second lens group having a positive refractive power overall and at least one set of cemented lenses; and a third lens group. The wide angle zoom lens varies intervals between the first lens group, the second lens group, and the third lens group on the optical axis and thereby, zooms from the wide angle end to the telephoto end (the configuration above being a basic configuration).

To achieve an object, various conditions are set as indicated below.

The wide angle zoom lens according to the present invention and having the basic configuration, preferably satisfies the following conditional expressions where $\upsilon max2a$ is the Abbe number of the lens that has the least dispersion among the lenses configuring a cemented lens included in the second lens group and $\upsilon maxg23$ is the Abbe number of the lens having the lesser dispersion among the second lens and the third lens included in the first lens group.

$$70 \leq \upsilon max2a \leq 99 \tag{1}$$

$$70 \leq \upsilon maxg23 \leq 99 \tag{2}$$

Satisfying conditional expressions (1) and (2) enables by a simple configuration, favorable correction of chromatic aberration, which becomes conspicuous with wide angle views, high zoom ratios, and large apertures. As a result, imaging in not only the visible light region, but also in the infrared light region becomes possible, enabling a wide angle zoom lens to be realized that has a high zoom ratio, large aperture, and high resolution.

Satisfying conditional expression (1) enables proper control of dispersion and anomalous dispersion at the second lens group and favorable correction of chromatic aberration. Although the present invention has a configuration that is advantageous in correcting chromatic aberration by including a cemented lens formed by a negative lens and a positive lens in the second lens group, satisfying conditional expression (1) enables more effective correction of chromatic aberration to be obtained. Below the lower limit of conditional expression (1), the correction of chromatic aberration, particularly chromatic difference of magnification on and near the optical axis, becomes difficult. Meanwhile, above the upper limit of conditional expression (1), dispersion and anomalous dispersion at the second lens group are over-corrected, making favorable correction of chromatic aberration difficult.

An even more desirable effect can be expected by satisfying conditional expression (1) within the following range.

$$77 \leq \upsilon max2a \leq 85 \tag{1a}$$

Satisfying the range prescribed by conditional expression (1a) enables yet more suitable control of dispersion and anomalous dispersion at the second lens group, enabling more favorable correction of chromatic difference of magnification on and near the optical axis.

Satisfying conditional expression (2) enables proper control of dispersion at the first lens group, enabling favorable correction of chromatic aberration. Below the lower limit of conditional expression (2), the correction of chromatic aberration, particularly chromatic difference of magnification at the wide angle end, becomes difficult. Meanwhile, above the upper limit of conditional expression (2), dispersion at the first lens group is over-corrected, making favorable correction of chromatic aberration difficult.

An even more desirable effect can be expected by satisfying conditional expression (2) within the following range.

$$75 \leq \upsilon maxg23 \leq 90 \tag{2a}$$

Satisfying the range prescribed by conditional expression (2a) enables yet more suitable control of dispersion at the first lens group, enabling more favorable correction of chromatic difference of magnification.

To achieve an object, various conditions are set as indicated below.

The wide angle zoom lens according to the present invention and having the basic configuration, preferably satisfies the following conditional expressions, where $\upsilon max2a$ is the Abbe number of the lens that has the least dispersion among the lenses configuring a cemented lens included in the second lens group, fg1 is a composite focal length of the first lens group, and fw is the focal length of the entire optical system at the wide angle end.

$$70 \leq \upsilon max2a \leq 99 \tag{1}$$

$$-10 \leq fg1/fw \leq -2.4 \tag{3}$$

Satisfying conditional expressions (1) and (3) enables a short overall length of the optical system to be maintained together with favorable correction of chromatic aberration, comatic aberration, and spherical aberration, which become conspicuous with wide angle views, high zoom ratios, and large apertures. As a result, a wide angle zoom lens having a short overall length and, favorable chromatic aberration correction and peripheral resolution performance can be realized.

Conditional expression (1) is as described above. Conditional expression (3) prescribes a ratio of the composite focal length of the first lens group and the focal length of the entire optical system at the wide angle end. Satisfying conditional expression (3) enables a short overall length of the optical system to be maintained together with favorable correction of comatic aberration and spherical aberration. Below the lower limit of conditional expression (3), the correction of comatic aberration at the telephoto end becomes difficult, whereby resolution in the periphery drops. In addition, reduction of the overall length of the optical system becomes difficult. Meanwhile, above the upper limit of conditional expression (3), the power of the first lens group becomes too strong, making correction of spherical aberration at the telephoto end difficult.

In the wide angle zoom lens according to the present invention, satisfying each of the conditional expressions (1) to (3) enables a compact optical system having higher resolution to be realized.

The wide angle zoom lens according to the present invention preferably satisfies the following conditional expression, where f123 is a composite focal length of the first to third lenses included in the first lens group and fw is the focal length of the entire optical system at the wide angle end.

$$-6 \leq f123/fw \leq -1 \tag{4}$$

Conditional expression (4) prescribes a ratio of the composite focal length of the first to third lenses included in the first lens group and the focal length of the entire optical system at the wide angle end. Satisfying conditional expression (4) enables a wider angle of view and a higher zoom ratio, while a short overall length of the optical system is maintained. Below the lower limit of conditional expression (4), the overall length of the optical system increases, making reductions in the size of the optical system difficult. Meanwhile, above the upper limit of conditional expression (4), wide angle views become difficult to achieve by the optical system.

The wide angle zoom lens according to the present invention is preferably configured to include one negative lens in the third lens group and preferably satisfies the following conditional expression, where f3gn is the focal length of the negative lens, and ft is the focal length of the entire optical system at the telephoto end.

$$-0.73 \leq ft/f3gn \leq -0.22 \tag{5}$$

Conditional expression (5) prescribes in a case where the third lens group is configured to include a negative lens, a ratio of the focal length of the negative lens and the focal length of the entire optical system at the telephoto end. Satisfying conditional expression (5) enables a higher zoom ratio to be achieved, while a short overall length of the optical system is maintained. Below the lower limit of conditional expression (5), the incident angle of light to the imaging plane at the telephoto end becomes too large. As a result, the type of the solid-state image sensing device, which is used commonly, becomes limited and thus, is undesirable. Meanwhile, above the upper limit of conditional expression (5), it becomes difficult to reduce the number of lenses configuring the third lens group and achieve a high zoom ratio. As a result, to realize a high zoom ratio, the number of lenses, of the third lens group has to be increased, making size reductions and simplification of the optical system difficult.

An even more desirable effect can be expected by satisfying conditional expression (5) within the following range.

$$-0.55 \leq ft/f3gn \leq -0.3 \tag{5a}$$

Satisfying the range prescribed by conditional expression (5a) enables higher zoom ratios to be achieved, while a short overall length of the optical system is maintained.

The wide angle zoom lens according to the present invention is preferably configured to include one or more positive lenses disposed in the third lens group and/or thereafter and preferably satisfies the following conditional expression, where f3gp is the focal length of the positive lens having the strongest refractive power among the positive lenses and ft is the focal length of the entire optical system at the telephoto end.

$$0 \leq ft/f3gp \leq 0.33 \tag{6}$$

Conditional expression (6) prescribes in a case where one or more positive lenses are disposed in the third lens group and/or thereafter, a ratio of the refractive power of the positive lens having the strongest refractive power among the one or more positive lenses and the focal length of the entire optical system at the telephoto end. Satisfying conditional expression (6) enables effective correction of spherical aberration and field curvature. Below the lower limit of conditional expression (6), positioning the exit pupil away from the image plane becomes difficult and the incident angle of light to the image plane becomes too large. As a result, the type of solid-state image sensing device, which is used commonly, becomes limited and thus, is undesirable. Meanwhile, above the upper limit of conditional expression (6), the correction of spherical aberration at the wide angle end becomes insufficient and the field of curvature at the telephoto end becomes excessively positive curvature and thus, is undesirable.

The wide angle zoom lens according to the present invention preferably satisfies the following conditional expression, where ΔD2 is the distance that the second lens group is moved during zooming from the wide angle end to the telephoto end, Y is the maximum image height, fw is the focal length of the entire optical system at the wide angle end, and ft is the focal length of the entire optical system at the telephoto end.

$$0.5 \leq (\Delta D2/Y) \times (fw/ft) \leq 2.9 \tag{7}$$

Conditional expression (7) prescribes a product of a ratio of the distance that the second lens group is moved during zooming from the wide angle end to the telephoto end and the maximum image height, and a ratio of the focal length of the entire optical system at the wide angle end and the focal length of the entire optical system at the telephoto end. Satisfying conditional expression (7) enables higher resolution, while a short overall length of the optical system is maintained. Below the lower limit of conditional expression (7), the distance that the second lens group is moved during zooming becomes small, while variations of aberration during zooming become conspicuous and thus, is undesirable. Meanwhile, above the upper limit of conditional expression (7), the distance that the second lens group is moved during zooming becomes large, whereby the overall length of the optical system increases and thus, is undesirable.

The wide angle zoom lens according to the present invention preferably satisfies the following conditional expression, where N1 is the refractive index for d-line of the first lens included in the first lens group.

$$1.70 \leq N1 \leq 2.1 \tag{8}$$

Satisfying conditional expression (8) enables an optical system having a wider angle of view and higher resolution to be realized. Below the lower limit of conditional expression (8), wide angles of view become difficult to achieve. Meanwhile, above the upper limit of conditional expression (8), negative distortion increases and correction becomes difficult.

The wide angle zoom lens according to the present invention is preferably configured to include a negative lens disposed farthest on the object side of the third lens group and preferably satisfies the following conditional expression, where f3g1 is the focal length of the negative lens and ft is the focal length of the entire optical system at the telephoto end.

$$-0.73 \leq ft/f3g1 \leq -0.2 \tag{9}$$

Conditional expression (9) prescribes in a case where a negative lens is disposed farthest on the object side of the third lens group, a ratio of the focal length of the negative lens and the focal length of the entire optical system at the telephoto end. Satisfying conditional expression (9) enables a high zoom ratio, while spherical aberration and field curvature are effectively corrected. Below the lower limit of conditional expression (9), the position of the principal point of the third lens group approaches the object side, whereby a high zoom ratio becomes difficult to achieve. Meanwhile, above the upper limit of conditional expression (9), spherical aberration at the wide angle end is over-corrected and field curvature at the telephoto end becomes excessively positive curvature and thus, is undesirable.

An even more desirable effect can be expected by satisfying conditional expression (9) within the following range.

$$-0.55 \leq ft/f3g1 \leq -0.3 \tag{9a}$$

Satisfying the range prescribed by conditional expression (9a) enables a higher zoom ratio, while spherical aberration and field curvature are more effectively corrected.

The wide angle zoom lens according to the present invention preferably satisfies the following conditional expression, where υ2 is the Abbe number for d-line of the second lens included in the first lens group.

$$70 \leq \upsilon 2 \leq 98 \tag{10}$$

Satisfying conditional expression (10) enables favorable correction of chromatic aberration. Below the lower limit of conditional expression (10), longitudinal chromatic aberration becomes difficult to correct. Meanwhile, above the upper limit of conditional expression (10), longitudinal chromatic aberration becomes over-corrected and thus, is undesirable.

An even more desirable effect can be expected by satisfying conditional expression (10) within the following range.

$$75 \leq \upsilon 2 \leq 90 \tag{10a}$$

Satisfying the range prescribed by conditional expression (10a) enables more favorable correction of chromatic aberration.

The wide angle zoom lens according to the present invention preferably satisfies the following conditional expression, where υ3 is the Abbe number for d-line of the third lens included in the first lens group.

$$30 \leq \upsilon 3 \leq 98 \quad (11)$$

Satisfying conditional expression (11) enables favorable correction of chromatic aberration. Below the lower limit of conditional expression (11), correction of chromatic aberration at the wide angle end, particularly chromatic difference of magnification, becomes difficult. Meanwhile, above the upper limit of conditional expression (11), longitudinal chromatic aberration at the telephoto end becomes over-corrected, leading to increased blue flare in the periphery.

An even more desirable effect can be expected by satisfying conditional expression (11) within the following range.

$$30 \leq \upsilon 3 \leq 70 \quad (11a)$$

Satisfying the range prescribed by conditional expression (11a) enables more favorable correction of chromatic aberration.

The wide angle zoom lens according to the present invention includes a positive lens disposed farthest on the image plane side of the first lens group and having a convex surface on the object side. With this configuration, chromatic difference of magnification particularly at the wide angle end becomes favorably corrected.

The wide angle zoom lens according to the present invention is configured such that the effective diameter of the second lens group is greater than the effective diameter of the third lens group, more specifically, the effective diameter of the rear surface of the lens farthest on the image side of the second lens group is greater than the effective diameter of the front surface of the lens farthest on the object side of the third lens group. This configuration, in an optical system having a large aperture, is advantageous in correcting spherical aberration, while a large effective diameter in the second lens group is maintained.

The wide angle zoom lens according to the present invention can be configured to include an aperture stop that is fixed between the first lens group and the second lens group. With such a configuration, mechanical components near the aperture stop such as the shutter can be reduced in size, enabling a reduction in the size of the module along a dimension orthogonal to the optical axis.

The wide angle zoom lens according to the present invention includes farthest on the image plane side of the second lens group, two lenses including a negative lens and a positive lens sequentially from the object side. With such a configuration, in addition to a relatively large zoom ratio, the incident angle of light to the sensor is decreased, enabling a large back focus to be established.

The wide angle zoom lens according to the present invention is preferably configured to include a set of cemented lenses in the second lens group and preferably satisfies the following conditional expression, where $\Theta mgf$ is the partial dispersion ratio of the negative lens, $\Theta pgf$ is the partial dispersion ratio of the positive lens, $\upsilon m$ is the Abbe number for d-line of the negative lens, and $\upsilon p$ is the Abbe number for d-line of the positive lens.

$$|(\Theta mgf - \Theta pgf)/(\upsilon m - \upsilon p)| \leq 0.003 \quad (12)$$

An even more desirable effect can be expected by satisfying conditional expression (12) within the following limit.

$$|(\Theta mgf - \Theta pgf)/(\upsilon m - \upsilon p)| \leq 0.0005 \quad (12a)$$

Conditional expression (12) prescribes a ratio of the difference of the partial dispersion ratio of the negative lens and the partial dispersion ratio of the positive lens configuring the cemented lens included in the second lens group, and the difference of the Abbe number for d-line of the negative lens and the Abbe number for d-line of the positive lens configuring the cemented lens included in the second lens group. Satisfying conditional expression (12) enables favorable correction of chromatic aberration. Below the lower limit of conditional expression (12), it becomes difficult to favorably maintain anomalous dispersion and favorable correction of longitudinal chromatic aberration of a wide wavelength range becomes impossible. Meanwhile, above the upper limit of conditional expression (12), it becomes difficult to favorably maintain anomalous dispersion and favorable correction of longitudinal chromatic aberration of a wide wavelength range becomes impossible. Satisfying the range prescribed by conditional expression (12a) enables more favorable correction of chromatic aberration over the entire zoom range.

In the wide angle zoom lens according to the present invention, negative/positive is assumed of the configuration of the lenses in the third lens group and thereafter. As a result, in addition to a relatively large zoom ratio, the incident angle of light to the sensor is reduced, enabling a large back focus to be established.

In the wide angle zoom lens according to the present invention, the third lens group and/or lens groups thereafter are configured to include two lenses, a negative lens and a positive lens, sequentially from the object side. With such a configuration, demanded imaging performance can be obtained by a most simple configuration of the third lens group and thereafter, and the overall length of the optical system can be reduced.

Further, forming a convex surface on the object side of the positive lens disposed farthest on the image plane side of the third lens group and/or lens groups thereafter enables favorable correction of spherical aberration. Forming a concave surface on the image plane side of the negative lens disposed farthest on the object side of the third lens group and/or lens groups thereafter enables favorable correction of spherical aberration. In addition, fixing the third lens group and lens groups thereafter enables variations in aberration occurring during zooming, at the third lens group and lens groups thereafter to be made smaller.

The wide angle zoom lens according to the present invention preferably satisfies the following conditional expression, where for the negative lens disposed farthest on the object side of the third lens group, N3gn is the refractive index for d-line and υ3gn is the Abbe number for d-line.

$$1.48 \leq N3gn \leq 1.7 \quad (13)$$

$$28 \leq \upsilon 3gn \quad (14)$$

Conditional expressions (13) and (14) represent more effective conditions for realizing a wide angle zoom lens having a high zoom ratio and high resolution.

Satisfying conditional expression (13) enables a wide angle zoom lens capable of a high zoom ratio to be realized. Below the lower limit of conditional expression (13), the position of the principal point of the third lens group moves toward the object side, making large zoom ratios difficult to achieve. Meanwhile, above the upper limit of conditional expression (13), field curvature at the wide angle end becomes over-corrected and wide angle views become difficult to achieve.

Satisfying conditional expression (14) enables favorable correction of longitudinal chromatic aberration over the entire zoom range. Below the lower limit of conditional expression (14), favorable correction of longitudinal chromatic aberration over the entire zoom range becomes difficult.

An even more desirable effect can be expected by satisfying conditional expression (14) within the following range.

$$28 \leq \nu 3gn \leq 55 \quad (14a)$$

Satisfying the range prescribed by conditional expression (14a) enables more favorable correction of longitudinal chromatic aberration over the entire zoom range.

The wide angle zoom lens according to the present invention preferably satisfies the following conditional expression, where ωW is the half angle of view of the optical system at the wide angle end, fw is the focal length of the entire optical system at the wide angle end, and ft is the focal length of the entire optical system at the telephoto end.

$$10 \leq \tan \omega W \times (ft/fw) \leq 20 \quad (15)$$

Conditional expression (15) prescribes a product of a tangential value of the half angle of view of the optical system at the wide angle end and a ratio of the focal length of the entire optical system at the wide angle end and the focal length of the entire optical system at the telephoto end. Satisfying conditional expression (15) enables both a wide angle view and a high zoom ratio to be achieved easily, while high resolution is maintained. Below the lower limit of conditional expression (15), achieving both a wide angle view and a high zoom ration becomes difficult. Meanwhile, above the upper limit of conditional expression (15), achieving both a wide angle of view and a high zoom ratio, while high resolution is maintained becomes impossible.

The wide angle zoom lens according to the present invention preferably satisfies the following conditional expression, where L is the overall length of the optical system and fw is the focal length of the entire optical system at the wide angle end.

$$25 \leq L/fw \leq 35 \quad (16)$$

Conditional expression (16) prescribes a ratio of the overall length of the optical system and the focal length of the entire optical system at the wide angle end. Satisfying conditional expression (16) enables a compact optical system having high resolution to be realized easily. Below the lower limit of conditional expression (16), field curvature at the wide angle end becomes conspicuous and thus, is undesirable. Meanwhile, above the upper limit of conditional expression (16), the overall length of the optical system increases, making reductions in the size of the optical system difficult.

As described, according to the present invention, by providing the configuration above, a wide angle zoom lens having a simple configuration, a high zoom ratio, large aperture, and high resolution can be realized. In addition, a wide angle zoom lens having a short overall length and, favorable chromatic aberration correction and peripheral resolution performance can be realized.

In particular, in the present invention, satisfying the conditions above enables a wide angle zoom lens to be realized that is capable of capturing images in not only the visible light region but also in the near-infrared light region, and has a high zoom ratio, large aperture, and high resolution.

Embodiments of the wide angle zoom lens according to the present invention will be described in detail with reference to the accompanying drawings. The present invention is not limited by the embodiments.

FIG. 1 is a diagram depicting, along the optical axis, a configuration of the wide angle zoom lens according to a first embodiment. The wide angle zoom lens is configured to include sequentially from the object side nearest a non-depicted object, a first lens group $G_{11}$ having a negative refractive power, a second lens group $G_{12}$ having a positive refractive power, and a third lens group $G_{13}$ having a negative refractive power. The aperture stop STP prescribing a given aperture is disposed between the first lens group $G_{11}$ and the second lens group $G_{12}$. A cover glass CG is disposed between the third lens group $G_{13}$ and the image plane IMG.

The first lens group $G_{11}$ is configured to include sequentially from the object side, a negative lens $L_{111}$ (first lens), a negative lens $L_{112}$ (second lens), a negative lens $L_{113}$ (third lens), a negative lens $L_{114}$, and a positive lens $L_{115}$. The negative lens $L_{114}$ and the positive lens $L_{115}$ are cemented. The material of the negative lens $L_{114}$ is EFL5 and the material of the positive lens $L_{115}$ is SNPH3.

The second lens group $G_{12}$ is configured to include sequentially from the object side, a positive lens $L_{121}$, a negative lens $L_{122}$, a positive lens $L_{123}$, a negative lens $L_{124}$, and a positive lens $L_{125}$. Both surfaces of the positive lens $L_{121}$ are aspheric. The negative lens $L_{122}$ and the positive lens $L_{123}$ are cemented. The material of the negative lens $L_{122}$ is BSC7 and the material of the positive lens $L_{123}$ is FCD100. Both surfaces of the positive lens $L_{125}$ are aspheric.

The third lens group $G_{13}$ is configured to include sequentially from the object side, a negative lens $L_{131}$ and a positive lens $L_{132}$.

The wide angle zoom lens moves the second lens group $G_{12}$ along the optical axis, from the image plane IMG side toward the object side and thereby, performs zooming from the wide angle end to the telephoto end. The wide angle zoom lens corrects the position of the image plane IMG with zooming by moving the first lens group $G_{11}$ along the optical axis, from the object side toward the image plane IMG side. The aperture stop STP and the third lens group $G_{13}$ remain fixed and do not move during zooming.

Here, various types of data related to the wide angle zoom lens according to the first embodiment are given.

Focal length of entire wide angle zoom lens = 2.87 (fw: wide angle end) to 11.65 (ft: telephoto end)
F number = 1.43 (wide angle end) to 2.63 (telephoto end)
Angle of view (2ω) = 74.40 (wide angle end) to 15.60 (telephoto end)
Maximum image height (Y) = 3.20
Composite focal length of first lens group $G_{11}$ (fg1) = −9.39
Composite focal length of second lens group $G_{12}$ = 13.46
Composite focal length of third lens group $G_{13}$ = −2754.12
Zoom ratio = 4.06
Effective diameter of rear surface of lens farthest on image side of second lens group $G_{12}$ = 10.38
Effective diameter of front surface of lens farthest on object side of third lens group $G_{13}$ = 9.66

| (Lens data) | | | |
|---|---|---|---|
| $r_1$ = 61.120 | $d_1$ = 1.200 | $nd_1$ = 1.7725 | $\nu d_1$ = 49.62 |
| $r_2$ = 9.224 | $d_2$ = 4.575 | | |
| $r_3$ = 217.093 | $d_3$ = 1.200 | $nd_2$ = 1.497 | $\nu d_2$ = 81.61 |
| $r_4$ = 42.377 | $d_4$ = 2.133 | | |
| $r_5$ = −20.410 | $d_5$ = 1.000 | $nd_3$ = 1.7725 | $\nu d_3$ = 49.62 |
| $r_6$ = −169.845 | $d_6$ = 0.100 | | |
| $r_7$ = 31.249 | $d_7$ = 1.000 | $nd_4$ = 1.58144 | $\nu d_4$ = 40.89 |
| $r_8$ = 18.960 | $d_8$ = 1.922 | $nd_5$ = 1.95906 | $\nu d_5$ = 17.47 |
| $r_9$ = 46.642 | $d_9$ = D(9) (variable) | | |

-continued

| | | | |
|---|---|---|---|
| $r_{10} = \infty$ (aperture stop) | $d_{10} = D(10)$ (variable) | | |
| $r_{11} = 14.868$ (aspheric) | $d_{11} = 3.397$ | $nd_6 = 1.4971$ | $vd_6 = 81.56$ |
| $r_{12} = -123.149$ (aspheric) | $d_{12} = 1.779$ | | |
| $r_{13} = 33.629$ | $d_{13} = 0.600$ | $nd_7 = 1.5168$ | $vd_7 = 64.20$ |
| $r_{14} = 8.965$ | $d_{14} = 5.693$ | $nd_8 = 1.437$ | $vd_8 = 95.10$ |
| $r_{15} = -13.032$ | $d_{15} = 0.100$ | | |
| $r_{16} = 19.048$ | $d_{16} = 0.600$ | $nd_9 = 1.95906$ | $vd_9 = 17.47$ |
| $r_{17} = 13.518$ | $d_{17} = 0.335$ | | |
| $r_{18} = 15.069$ (aspheric) | $d_{18} = 2.226$ | $nd_{10} = 1.4971$ | $vd_{10} = 81.56$ |
| $r_{19} = -926.768$ (aspheric) | $d_{19} = D(19)$ (variable) | | |
| $r_{20} = 61.936$ | $d_{20} = 0.600$ | $nd_{11} = 1.53172$ | $vd_{11} = 48.84$ |
| $r_{21} = 10.542$ | $d_{21} = 0.873$ | | |
| $r_{22} = 22.285$ | $d_{22} = 1.751$ | $nd_{12} = 1.8042$ | $vd_{12} = 46.5$ |
| $r_{23} = -206.297$ | $d_{23} = 5.000$ | | |
| $r_{24} = \infty$ | $d_{24} = 1.500$ | $nd_{13} = 1.51633$ | $vd_{13} = 64.14$ |
| $r_{25} = \infty$ | $d_{25} = D(25)$ (variable) | | |
| $r_{26} = \infty$ (image plane) | | | |

Constant of the conic ($\epsilon$) and aspheric coefficients (A, B, C, D, E)

(Eleventh order)

$\epsilon = 1, A = 0, B = -6.15714 \times 10^{-5}, C = -3.17259 \times 10^{-6},$
$D = 4.95820 \times 10^{-8}, E = -1.32636 \times 10^{-9}$ (Twelfth order)

$\epsilon = 1, A = 0, B = 1.27088 \times 10^{-4}, C = -3.16020 \times 10^{-6},$
$D = 3.90315 \times 10^{-8}, E = -9.57772 \times 10^{-10}$ (Eighteenth order)

$\epsilon = 1, A = 0, B = 1.80287 \times 10^{-5}, C = -2.50933 \times 10^{-6},$
$D = -4.37450 \times 10^{-9}, E = 9.92704 \times 10^{-10}$ (Nineteenth order)

$\epsilon = 1, A = 0, B = 5.59937 \times 10^{-5}, C = -3.19937 \times 10^{-6},$
$D = 3.52337 \times 10^{-8}, E = 4.03307 \times 10^{-10}$ (Zoom data)

| | Wide angle end | Telephoto end |
|---|---|---|
| D(9) | 23.7403 | 1.3707 |
| D(10) | 13.1651 | 1.033 |
| D(19) | 0.6 | 12.7321 |
| D(25) | 2.6201 | 2.6184 |

(Values related to conditional expression (1))

vmax2a = 95.10 (Abbe number for d-line of positive lens $L_{123}$)
(Values related to conditional expression (2))

vmaxg23 = 81.61 (Abbe number for d-line of negative lens $L_{112}$)
(Values related to conditional expression (3))

fg1/fw = −3.27
(Values related to conditional expression (4))

f123 = −7.433 (composite focal length of negative lens $L_{111}$, negative lens $L_{112}$, and negative lens $L_{113}$)
f123/fw = −2.59
(Values related to conditional expression (5))

f3gn = −23.78 (focal length of negative lens $L_{131}$)
ft/f3gn = −0.49
(Values related to conditional expression (6))

f3gp = 388.33 (focal length of positive lens $L_{132}$)
ft/f3gp = 0.03

(Values related to conditional expression (7))

ΔD2 = 12.1321 (distance that second lens group $G_{12}$ is moved during zooming from wide angle end to telephoto end)
(ΔD2/Y) × (fw/ft) = 0.93
(Values related to conditional expression (8))

N1 = 1.7725 (refractive index for d-line of negative lens $L_{111}$)
(Values related to conditional expression (9))

f3g1 = −23.78 (focal length of negative lens $L_{131}$)
ft/f3g1 = −0.49
(Values related to conditional expression (10))

v2 = 81.61 (Abbe number for d-line of negative lens $L_{112}$)
(Values related to conditional expression (11))

v3 = 49.62 (Abbe number for d-line of negative lens $L_{113}$)
(Values related to conditional expression (12))

Θmgf = 0.5343 (partial dispersion ratio of negative lens $L_{122}$)
Θpgf = 0.5334 (partial dispersion ratio of positive lens $L_{123}$)
vm = 64.20 (Abbe number for d-line of negative lens $L_{122}$)
vp = 95.10 (Abbe number for d-line of positive lens $L_{123}$)
(Θmgf − Θpgf)/(vm − vp) = −0.000029
(Values related to conditional expression (13))

N3gn = 1.5317 (refractive index for d-line of negative lens $L_{131}$)
(Values related to conditional expression (14))

v3gn = 48.84 (Abbe number for d-line of negative lens $L_{131}$)
(Values related to conditional expression (15))

tanωW × (ft/fw) = 14.53
(Values related to conditional expression (16))

L/fw = 26.90

FIG. 2 is a diagram of various types of aberration occurring in the wide angle zoom lens according to the first embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

FIG. 3 is a diagram depicting, along the optical axis, a configuration of the wide angle zoom lens according to a second embodiment. The wide angle zoom lens is configured to include sequentially from the object side nearest a non-depicted object, a first lens group $G_{21}$ having a negative refractive power, a second lens group $G_{22}$ having a positive refractive power, and a third lens group $G_{23}$ having a positive refractive power. The aperture stop STP prescribing a given aperture is disposed between the first lens group $G_{21}$ and the second lens group $G_{22}$. The cover glass CG is disposed between the third lens group $G_{23}$ and the image plane IMG.

The first lens group $G_{21}$ is configured to include sequentially from the object side, a negative lens $L_{211}$ (first lens), a negative lens $L_{212}$ (second lens), a negative lens $L_{213}$ (third lens), and a positive lens $L_{214}$.

The second lens group $G_{22}$ is configured to include sequentially from the object side, a positive lens $L_{221}$, a positive lens $L_{222}$, a negative lens $L_{223}$, a negative lens $L_{224}$, and a positive lens $L_{225}$. Both surfaces of the positive lens $L_{221}$ are aspheric. The positive lens $L_{222}$ and the negative lens $L_{223}$ are cemented. The negative lens $L_{224}$ and the positive lens $L_{225}$ are cemented. The material of the positive lens $L_{222}$ is FCD1; the material of the negative lens $L_{223}$ is BSC7; the material of the negative lens $L_{224}$ is NBFD10; and the material of the positive lens $L_{225}$ is FCD1.

The third lens group $G_{23}$ is configured to include sequentially from the object side, a negative lens $L_{231}$ and a positive lens $L_{232}$. Both surfaces of the positive lens $L_{232}$ are aspheric.

The wide angle zoom lens moves the second lens group $G_{22}$ along the optical axis, from the image plane IMG side toward the object side and thereby, performs zooming from the wide angle end to the telephoto end. During zooming, the aperture stop STP is also moved along the optical axis, from the image plane IMG side toward the object side. The wide angle zoom lens corrects the position of the image plane IMG by moving the first lens group $G_{21}$ along the optical axis, from the object side toward the image plane IMG side. The third lens group $G_{23}$ remains fixed and does not move during zooming.

Here, various types of data related to the wide angle zoom lens according to the second embodiment are given.

---

Focal length of entire wide angle zoom lens = 2.88 (fw: wide angle end) to 11.60 (ft: telephoto end)
F number = 1.44 (wide angle end) to 2.89 (telephoto end)
Angle of view (2ω) = 77.10 (wide angle end) to 16.48 (telephoto end)
Maximum image height (Y) = 3.40
Composite focal length of first lens group $G_{21}$ (fg1) = −8.38
Composite focal length of second lens group $G_{22}$ = 16.64
Composite focal length of third lens group $G_{23}$ = 31.54
Zoom ratio = 4.03
Effective diameter of rear surface of lens farthest on image side of second lens group $G_{22}$ = 11.18
Effective diameter of front surface of lens farthest on object side of third lens group $G_{23}$ = 8.94

(Lens data)

| | | | |
|---|---|---|---|
| $r_1$ = 74.400 | $d_1$ = 1.000 | $nd_1$ = 1.83481 | $vd_1$ = 42.72 |
| $r_2$ = 9.700 | $d_2$ = 4.790 | | |
| $r_3$ = 213.600 | $d_3$ = 0.800 | $nd_2$ = 1.437 | $vd_2$ = 95.10 |
| $r_4$ = 15.100 | $d_4$ = 3.380 | | |
| $r_5$ = −24.530 | $d_5$ = 0.700 | $nd_3$ = 1.7725 | $vd_3$ = 49.62 |
| $r_6$ = 70.460 | $d_6$ = 0.100 | | |
| $r_7$ = 26.360 | $d_7$ = 2.300 | $nd_4$ = 1.95906 | $vd_4$ = 17.47 |
| $r_8$ = −2217.600 | $d_8$ = D(8) (variable) | | |
| $r_9$ = ∞ (aperture stop) | $d_9$ = 1.800 | | |
| $r_{10}$ = 15.038 (aspheric) | $d_{10}$ = 3.410 | $nd_5$ = 1.4971 | $vd_5$ = 81.56 |
| $r_{11}$ = −46.370 (aspheric) | $d_{11}$ = 1.620 | | |
| $r_{12}$ = 28.900 | $d_{12}$ = 3.900 | $nd_6$ = 1.497 | $vd_6$ = 81.61 |
| $r_{13}$ = −14.450 | $d_{13}$ = 0.700 | $nd_7$ = 1.5168 | $vd_7$ = 64.20 |
| $r_{14}$ = −35.300 | $d_{14}$ = 0.200 | | |
| $r_{15}$ = 60.000 | $d_{15}$ = 0.600 | $nd_8$ = 1.834 | $vd_8$ = 37.34 |
| $r_{16}$ = 9.300 | $d_{16}$ = 3.700 | $nd_9$ = 1.497 | $vd_9$ = 81.61 |
| $r_{17}$ = −34.140 | $d_{17}$ = D(17) (variable) | | |
| $r_{18}$ = −27.100 | $d_{18}$ = 0.700 | $nd_{10}$ = 1.5168 | $vd_{10}$ = 64.2 |
| $r_{19}$ = 36.550 | $d_{19}$ = 5.000 | | |
| $r_{20}$ = 32.264 (aspheric) | $d_{20}$ = 1.860 | $nd_{11}$ = 1.59201 | $vd_{11}$ = 67.02 |
| $r_{21}$ = −16.195 (aspheric) | $d_{21}$ = 3.000 | | |
| $r_{22}$ = ∞ | $d_{22}$ = 1.500 | $nd_{12}$ = 1.51633 | $vd_{12}$ = 64.14 |
| $r_{23}$ = ∞ | $d_{23}$ = D(23) (variable) | | |
| $r_{24}$ = ∞ (image plane) | | | |

Constant of the conic (ε) and aspheric coefficients (A, B, C, D, E)

(Tenth order)
ε = 1.16, A = 0, B = −3.04470 × 10$^{-5}$, C = −7.58560 × 10$^{-7}$,
D = 1.66321 × 10$^{-8}$, E = −1.06873 × 10$^{-10}$
(Eleventh order)
ε = 1, A = 0, B = 7.56417 × 10$^{-5}$, C = −8.77300 × 10$^{-7}$,
D = 2.06971 × 10$^{-8}$, E = −1.34700 × 10$^{-10}$
(Twentieth order)
ε = −9.65, A = 0, B = 3.66473 × 10$^{-5}$, C = 3.02026 × 10$^{-7}$,
D = 1.48292 × 10$^{-8}$, E = 1.00056 × 10$^{-8}$
(Twenty-first order)
ε = 1, A = 0, B = 1.16720 × 10$^{-4}$, C = 2.77584 × 10$^{-6}$,
D = −1.63993 × 10$^{-7}$, E = 1.47411 × 10$^{-8}$ (Zoom data)

| | Wide angle end | Telephoto end |
|---|---|---|
| D(8) | 40.004 | 6.555 |
| D(17) | 1.331 | 20.219 |
| D(23) | 4.600 | 4.600 |

(Values related to conditional expression (1))
vmax2a = 81.61 (Abbe number for d-line of positive lens $L_{222}$)
(Values related to conditional expression (2))

vmaxg23 = 95.10 (Abbe number for d-line of negative lens $L_{212}$)
(Values related to conditional expression (3))

fg1/fw = −2.92
(Values related to conditional expression (4))

f123 = −5.328 (composite focal length of negative lens $L_{211}$, negative lens $L_{212}$, and negative lens $L_{213}$)
f123/fw = −1.85
(Values related to conditional expression (5))

f3gn = −29.74 (focal length of negative lens $L_{231}$)
ft/f3gn = −0.39
(Values related to conditional expression (6))

f3gp = 41.43 (focal length of positive lens $L_{232}$)
ft/f3gp = 0.28
(Values related to conditional expression (7))

ΔD2 = 18.888 (distance that second lens group $G_{22}$ is moved during zooming from wide angle end to telephoto end)
(ΔD2/Y) × (fw/ft) = 1.37
(Values related to conditional expression (8))

N1 = 1.83481 (refractive index for d-line of negative lens $L_{211}$)
(Values related to conditional expression (9))

f3g1 = −29.74 (focal length of negative lens $L_{231}$)
ft/f3g1 = −0.39
(Values related to conditional expression (10))

v2 = 95.10 (Abbe number for d-line of negative lens $L_{212}$)
(Values related to conditional expression (11))

v3 = 49.62 (Abbe number for d-line of negative lens $L_{213}$)
(Values related to conditional expression (12))

Θmgf = 0.5343 (partial dispersion ratio of negative lens $L_{223}$)
Θpgf = 0.5388 (partial dispersion ratio of positive lens $L_{222}$)

-continued vm = 64.20 (Abbe number for d-line of negative lens $L_{223}$)
vp = 81.61 (Abbe number for d-line of positive lens $L_{222}$)
($\Theta$mgf − $\Theta$pgf)/(vm − vp) = 0.000258
(Values related to conditional expression (13))

N3gn = 1.53168 (refractive index for d-line of negative lens $L_{231}$)
(Values related to conditional expression (14))

v3gn = 64.10 (Abbe number for d-line of negative lens $L_{231}$)
(Values related to conditional expression (15))

tan$\omega$W × (ft/fw) = 17.57
(Values related to conditional expression (16))

L/fw = 30.44

FIG. 4 is a diagram of various types of aberration occurring in the wide angle zoom lens according to the second embodiment. In the diagram, for curves depicting spherical aberration, the vertical axis represents the F number (Fno), solid lines depict wavelength characteristics corresponding to d-line ($\lambda$=587.56 nm), dotted lines depict wavelength characteristics corresponding to g-line ($\lambda$=435.84 nm), and dashed lines depict wavelength characteristics corresponding to C-line ($\lambda$656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

FIG. 5 is a diagram depicting, along the optical axis, a configuration of the wide angle zoom lens according to a third embodiment. The wide angle zoom lens is configured to include sequentially from the object side nearest a non-depicted object, a first lens group $G_{31}$ having a negative refractive power, a second lens group $G_{32}$ having a positive refractive power, and a third lens group $G_{33}$ having a negative refractive power. The aperture stop STP prescribing a given aperture is disposed between the first lens group $G_{31}$ and the second lens group $G_{32}$. The cover glass CG is disposed between the third lens group $G_{33}$ and the image plane IMG.

The first lens group $G_{31}$ is configured to include sequentially from the object side, a negative lens $L_{311}$ (first lens), a negative lens $L_{312}$ (second lens), a negative lens $L_{313}$ (third lens), a negative lens $L_{314}$, and a positive lens $L_{315}$. The negative lens $L_{314}$ and the positive lens $L_{315}$ are cemented. The material of the negative lens $L_{314}$ is TAFD25 and the material of the positive lens $L_{315}$ is FDS18.

The second lens group $G_{32}$ is configured to include sequentially from the object side, a positive lens $L_{321}$, a negative lens $L_{322}$, a positive lens $L_{323}$, a negative lens $L_{324}$, and a positive lens $L_{325}$. Both surfaces of the positive lens $L_{321}$ are aspheric. The negative lens $L_{322}$ and the positive lens $L_{323}$ are cemented. The material of the negative lens $L_{322}$ is BSC7 and the material of the positive lens $L_{323}$ is FCD1. Both surfaces of the negative lens $L_{324}$ are aspheric.

The third lens group $G_{33}$ is configured to include sequentially from the object side, a negative lens $L_{331}$ and a positive lens $L_{332}$.

The wide angle zoom lens moves the second lens group $G_{32}$ along the optical axis, from the image plane IMG side toward the object side and thereby, performs zooming from the wide angle end to the telephoto end. The wide angle zoom lens corrects the position of the image plane IMG with zooming by moving the first lens group $G_{31}$ along the optical axis, from the object side toward the image plane IMG side. The aperture stop STP and the third lens group $G_{33}$ remain fixed and do not move during zooming.

Here, various types of data related to the wide angle zoom lens according to the third embodiment are given.

Focal length of entire wide angle zoom lens = 2.87 (fw: wide angle end) to 11.65 (ft: telephoto end)
F number = 1.44 (wide angle end) to 2.62 (telephoto end)
Angle of view (2$\omega$) = 73.73 (wide angle end) to 15.53 (telephoto end)
Maximum image height (Y) = 3.20
Composite focal length of first lens group $G_{31}$ (fg1) = −8.04
Composite focal length of second lens group $G_{32}$ = 12.40
Composite focal length of third lens group $G_{33}$ = −78.39
Zoom ratio = 4.06
Effective diameter of rear surface of lens farthest on image side of second lens group $G_{32}$ = 4.97
Effective diameter of front surface of lens farthest on object side of third lens group $G_{33}$ = 4.73

(Lens data)

| | | | |
|---|---|---|---|
| $r_1$ = 46.430 | $d_1$ = 1.200 | $nd_1$ = 1.741 | $vd_1$ = 48.24 |
| $r_2$ = 10.314 | $d_2$ = 6.867 | | |
| $r_3$ = 75.682 | $d_3$ = 1.200 | $nd_2$ = 1.497 | $vd_2$ = 81.61 |
| $r_4$ = 28.408 | $d_4$ = 2.650 | | |
| $r_5$ = −16.390 | $d_5$ = 1.000 | $nd_3$ = 1.80484 | $vd_3$ = 41.79 |
| $r_6$ = 794.257 | $d_6$ = 0.100 | | |
| $r_7$ = 34.689 | $d_7$ = 1.000 | $nd_4$ = 1.91159 | $vd_4$ = 32.02 |
| $r_8$ = 17.129 | $d_8$ = 1.997 | $nd_5$ = 1.94594 | $vd_5$ = 16.29 |
| $r_9$ = 80.440 | $d_9$ = D(9) (variable) | | |
| $r_{10}$ = ∞ (aperture stop) | $d_{10}$ = D(10) (variable) | | |
| $r_{11}$ = 14.911 (aspheric) | $d_{11}$ = 4.0412 | $nd_6$ = 1.4971 | $vd_6$ = 81.56 |
| $r_{12}$ = −131.707 (aspheric) | $d_{12}$ = 0.1 | | |
| $r_{13}$ = 50.000 | $d_{13}$ = 0.600 | $nd_7$ = 1.5168 | $vd_7$ = 64.20 |
| $r_{14}$ = 10.118 | $d_{14}$ = 5.145 | $nd_8$ = 1.497 | $vd_8$ = 81.61 |
| $r_{15}$ = −14.347 | $d_{15}$ = 0.135 | | |
| $r_{16}$ = 14.211 (aspheric) | $d_{16}$ = 0.6 | $nd_9$ = 1.92286 | $vd_9$ = 20.88 |
| $r_{17}$ = 9.580 (aspheric) | $d_{17}$ = 1.2156 | | |
| $r_{18}$ = 12.100 | $d_{18}$ = 2.713 | $nd_{10}$ = 1.4971 | $vd_{10}$ = 81.56 |
| $r_{19}$ = −57.701 | $d_{19}$ = D(19) (variable) | | |
| $r_{20}$ = 43.109 | $d_{20}$ = 0.600 | $nd_{11}$ = 1.5556 | $vd_{11}$ = 67.09 |
| $r_{21}$ = 8.386 | $d_{21}$ = 1.165 | | |
| $r_{22}$ = 21.373 | $d_{22}$ = 1.920 | $nd_{12}$ = 1.5031 | $vd_{12}$ = 71.2 |
| $r_{23}$ = −35.692 | $d_{23}$ = 5.000 | | |
| $r_{24}$ = ∞ | $d_{24}$ = 1.5 | $nd_{13}$ = 1.51633 | $vd_{13}$ = 64.14 |
| $r_{25}$ = ∞ | $d_{25}$ = 2.62 | | |
| $r_{26}$ = ∞ (image plane) | | | |

Constant of the conic ($\epsilon$) and aspheric coefficients (A, B, C, D, E)

(Eleventh order)

$\epsilon$ = 1, A = 0, B = −1.39873 × $10^{-4}$, C = −2.56848 × $10^{-6}$,
D = −1.16702 × $10^{-8}$, E = −7.31 × $10^{-10}$
(Twelfth order)

$\epsilon$ = 1, A = 0, B = 1.14618 × $10^{-4}$, C = −2.25909 × $10^{-6}$,
D = −5.94198 × $10^{-8}$, E = 4.16 × $10^{-10}$
(Sixteenth order)

$\epsilon$ = 1, A = 0, B = 1.74625 × $10^{-5}$, C = −1.61275 × $10^{-6}$,
D = −4.55331 × $10^{-8}$, E = 9.07 × $10^{-10}$
(Seventeenth order)

$\epsilon$ = 1, A = 0, B = −1.80098 × $10^{-6}$, C = −1.70672 × $10^{-6}$,
D = −6.74538 × $10^{-8}$, E = 1.37 × $10^{-9}$ -continued (Zoom data)

| | Wide angle end | Telephoto end |
|---|---|---|
| D(9) | 21.495 | 1.304 |
| D(10) | 13.321 | 1.033 |
| D(19) | 0.600 | 11.888 |

(Values related to conditional expression (1))

νmax2a = 81.61 (Abbe number for d-line of positive lens $L_{323}$)
(Values related to conditional expression (2))

νmaxg23 = 81.61 (Abbe number for d-line of negative lens $L_{312}$)
(Values related to conditional expression (3))

fg1/fw = −2.80
(Values related to conditional expression (4))

f123 = −14.84 (composite focal length of negative lens $L_{311}$, negative lens $L_{312}$, and negative lens $L_{313}$)
f123/fw = −5.17
(Values related to conditional expression (5))

f3gn = −18.79 (focal length of negative lens $L_{331}$)
ft/f3gn = −0.62
(Values related to conditional expression (6))

f3gp = 105.91 (focal length of positive lens $L_{332}$)
ft/f3gp = 0.11
(Values related to conditional expression (7))

ΔD2 = 11.288 (distance that second lens group $G_{32}$ is moved during zooming from wide angle end to telephoto end)
(ΔD2/Y) × (fw/ft) = 0.87
(Values related to conditional expression (8))

N1 = 1.741 (refractive index for d-line of negative lens $L_{311}$)
(Values related to conditional expression (9))

f3g1 = −18.79 (focal length of negative lens $L_{331}$)
ft/f3g1 = −0.62
(Values related to conditional expression (10))

ν2 = 81.61 (Abbe number for d-line of negative lens $L_{312}$)
(Values related to conditional expression (11))

ν3 = 41.79 (Abbe number for d-line of negative lens $L_{313}$)
(Values related to conditional expression (12))

Θmgf = 0.5343 (partial dispersion ratio of negative lens $L_{322}$)
Θpgf = 0.5388 (partial dispersion ratio of positive lens $L_{323}$)
νm = 64.20 (Abbe number for d-line of negative lens $L_{322}$)
νp = 81.61 (Abbe number for d-line of positive lens $L_{323}$)
(Θmgf − Θpgf)/(νm − νp) = 0.000258
(Values related to conditional expression (13))

N3gn = 1.5556 (refractive index for d-line of negative lens $L_{331}$)
(Values related to conditional expression (14))

ν3gn = 67.09 (Abbe number for d-line of negative lens $L_{331}$)
(Values related to conditional expression (15))

tanωW × (ft/fw) = 13.87
(Values related to conditional expression (16))

L/fw = 27.27

FIG. 6 is a diagram of various types of aberration occurring in the wide angle zoom lens according to the third embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

FIG. 7 is a diagram depicting, along the optical axis, a configuration of the wide angle zoom lens according to a fourth embodiment. The wide angle zoom lens is configured to include sequentially from the object side nearest a non-depicted object, a first lens group $G_{41}$ having a negative refractive power, a second lens group $G_{42}$ having a positive refractive power, and a third lens group $G_{43}$ having a negative refractive power. The aperture stop STP prescribing a given aperture is disposed between the first lens group $G_{41}$ and the second lens group $G_{42}$. The cover glass CG is disposed between the third lens group $G_{43}$ and the image plane IMG.

The first lens group $G_{41}$ is configured to include sequentially from the object side, a negative lens $L_{411}$ (first lens), a negative lens $L_{412}$ (second lens), a negative lens $L_{413}$ (third lens), a negative lens $L_{414}$, and a positive lens $L_{415}$. The negative lens $L_{414}$ and the positive lens $L_{415}$ are cemented. The material of the negative lens $L_{414}$ is FDS1 and the material of the positive lens $L_{415}$ is FD60.

The second lens group $G_{42}$ is configured to include sequentially from the object side, a positive lens $L_{421}$, a negative lens a positive lens $L_{423}$, a negative lens $L_{424}$, and a positive lens $L_{425}$. Both surfaces of the positive lens $L_{421}$ are aspheric. The negative lens $L_{422}$ and the positive lens $L_{423}$ are cemented. The material of the negative lens $L_{422}$ is BSC7 and the material of the positive lens $L_{423}$ is FCD1. Both surfaces of the negative lens $L_{424}$ are aspheric.

The third lens group $G_{43}$ is configured to include sequentially from the object side, a negative lens $L_{431}$ and a positive lens $L_{432}$.

The wide angle zoom lens moves the second lens group $G_{42}$ along the optical axis, from the image plane IMG side toward the object side and thereby, performs zooming from the wide angle end to the telephoto end. The wide angle zoom lens corrects the position of the image plane IMG with zooming by moving the first lens group $G_{41}$ along the optical axis, from the object side toward the image plane IMG side. The aperture stop STP and the third lens group $G_{43}$ remain fixed and do not move during zooming.

Here, various types of data related to the wide angle zoom lens according to the fourth embodiment are given.

Focal length of entire wide angle zoom lens = 2.87 (fw: wide angle end) to 11.65 (ft: telephoto end)
F number = 1.44 (wide angle end) to 2.62 (telephoto end)
Angle of view (2ω) = 74.71 (wide angle end) to 15.53 (telephoto end)
Maximum image height (Y) = 3.21
Composite focal length of first lens group $G_{41}$ (fg1) = −8.04
Composite focal length of second lens group $G_{42}$ = 12.59
Composite focal length of third lens group $G_{43}$ = −59.81
Zoom ratio = 4.06
Effective diameter of rear surface of lens farthest on image side of second lens group $G_{42}$ = 4.97
Effective diameter of front surface of lens farthest on object side of third lens group $G_{43}$ = 4.41

(Lens data)

| $r_1$ = 35.533 | $d_1$ = 1.200 | $nd_1$ = 1.77252 | $vd_1$ = 38.54 |
|---|---|---|---|
| $r_2$ = 9.753 | $d_2$ = 3.858 | | |
| $r_3$ = 37.383 | $d_3$ = 1.200 | $nd_2$ = 1.497 | $vd_2$ = 81.61 |
| $r_4$ = 20.222 | $d_4$ = 3.809 | | |

-continued

| | | | |
|---|---|---|---|
| $r_5 = -14.488$ | $d_5 = 1.000$ | $nd_3 = 1.7725$ | $vd_3 = 38.55$ |
| $r_6 = 52.422$ | $d_6 = 0.100$ | | |
| $r_7 = 18.569$ | $d_7 = 1.000$ | $nd_4 = 1.93049$ | $vd_4 = 17.55$ |
| $r_8 = 8.594$ | $d_8 = 3.594$ | $nd_5 = 1.80105$ | $vd_5 = 25.46$ |
| $r_9 = 265.171$ | $d_9 = D(9)$ (variable) | | |
| $r_{10} = \infty$ (aperture stop) | $d_{10} = D(10)$ (variable) | | |
| $r_{11} = 14.816$ (aspheric) | $d_{11} = 3.973$ | $nd_6 = 1.4971$ | $vd_6 = 81.56$ |
| $r_{12} = -247.781$ (aspheric) | $d_{12} = 0.100$ | | |
| $r_{13} = 50.000$ | $d_{13} = 0.600$ | $nd_7 = 1.5168$ | $vd_7 = 64.20$ |
| $r_{14} = 9.828$ | $d_{14} = 5.369$ | $nd_8 = 1.497$ | $vd_8 = 81.61$ |
| $r_{15} = -13.942$ | $d_{15} = 0.100$ | | |
| $r_{16} = 13.891$ (aspheric) | $d_{16} = 0.600$ | $nd_9 = 1.92286$ | $vd_9 = 20.88$ |
| $r_{17} = 10.361$ (aspheric) | $d_{17} = 1.584$ | | |
| $r_{18} = 15.002$ | $d_{18} = 2.427$ | $nd_{10} = 1.4971$ | $vd_{10} = 81.56$ |
| $r_{19} = -68.611$ | $d_{19} = D(19)$ (variable) | | |
| $r_{20} = 18.310$ | $d_{20} = 0.600$ | $nd_{11} = 1.6727$ | $vd_{11} = 32.17$ |
| $r_{21} = 8.049$ | $d_{21} = 1.136$ | | |
| $r_{22} = 21.820$ | $d_{22} = 1.637$ | $nd_{12} = 1.57012$ | $vd_{12} = 32.19$ |
| $r_{23} = -321.148$ | $d_{23} = 5.000$ | | |
| $r_{24} = \infty$ | $d_{24} = 1.500$ | $nd_{13} = 1.51633$ | $vd_{13} = 64.14$ |
| $r_{25} = \infty$ | $d_{25} = 2.618$ | | |
| $r_{26} = \infty$ (image plane) | | | |

Constant of the conic (ϵ) and aspheric coefficients (A, B, C, D, E)

(Eleventh order)

ϵ = 1, A = 0, B = −1.33356 × 10⁻⁴, C = −2.29576 × 10⁻⁶,
D = −2.02142 × 10⁻⁸, E = −5.45895
(Twelfth order)

ϵ = 1, A = 0, B = 1.22917 × 10⁻⁴, C = −2.20807 × 10⁻⁶,
D = −5.70594 × 10⁻⁸, E = 4.30418
(Sixteenth order)

ϵ = 1, A = 0, B = 1.64812 × 10⁻⁵, C = −1.60623 × 10⁻⁶,
D = −4.33044 × 10⁻⁸, E = 9.66886
(Seventeenth order)

ϵ = 1, A = 0, B = 3.85249 × 10⁻⁶, C = −1.47880 × 10⁻⁶,
D = −6.50688 × 10⁻⁸, E = 1.49555

(Zoom data)

| | Wide angle end | Telephoto end |
|---|---|---|
| D(9) | 21.704 | 1.217 |
| D(10) | 12.475 | 1.032 |
| D(19) | 0.600 | 12.042 |

(Values related to conditional expression (1))

vmax2a = 81.61 (Abbe number for d-line of positive lens $L_{423}$)
(Values related to conditional expression (2))

vmaxg23 = 81.61 (Abbe number for d-line of negative lens $L_{412}$)
(Values related to conditional expression (3))

fg1/fw = −2.80
(Values related to conditional expression (4))

f123 = −16.01 (composite focal length of negative lens $L_{411}$, negative lens $L_{412}$, and negative lens $L_{413}$)
f123/fw = −5.58
(Values related to conditional expression (5))

f3gn = −18.80 (focal length of negative lens $L_{431}$)
ft/f3gn = −0.62

(Values related to conditional expression (6))

f3gp = 105.91 (focal length of positive lens $L_{432}$)
ft/f3gp = 0.11
(Values related to conditional expression (7))

ΔD2 = 11.443 (distance that second lens group $G_{42}$ is moved during zooming from wide angle end to telephoto end)
(ΔD2/Y) × (fw/ft) = 0.88
(Values related to conditional expression (8))

N1 = 1.77252 (refractive index for d-line of negative lens $L_{411}$)
(Values related to conditional expression (9))

f3g1 = −18.80 (focal length of negative lens $L_{431}$)
ft/f3g1 = −0.62
(Values related to conditional expression (10))

v2 = 81.61 (Abbe number for d-line of negative lens $L_{412}$)
(Values related to conditional expression (11))

v3 = 38.55 (Abbe number for d-line of negative lens $L_{413}$)
(Values related to conditional expression (12))

Θmgf = 0.5343 (partial dispersion ratio of negative lens $L_{422}$)
Θpgf = 0.5388 (partial dispersion ratio of positive lens $L_{423}$)
vm = 64.20 (Abbe number for d-line of negative lens $L_{422}$)
vp = 81.61 (Abbe number for d-line of positive lens $L_{423}$)
(Θmgf − Θpgf)/(vm − vp) = 0.000258
(Values related to conditional expression (13))

N3gn = 1.6727 (refractive index for d-line of negative lens $L_{431}$)
(Values related to conditional expression (14))

v3gn = 32.17 (Abbe number for d-line of negative lens $L_{431}$)
(Values related to conditional expression (15))

tanωW × (ft/fw) = 14.81
(Values related to conditional expression (16))

L/fw = 27.28

FIG. 8 is a diagram of various types of aberration occurring in the wide angle zoom lens according to the fourth embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

FIG. 9 is a diagram depicting, along the optical axis, a configuration of the wide angle zoom lens according to a fifth embodiment. The wide angle zoom lens is configured to include sequentially from the object side nearest a non-depicted object, a first lens group $G_{51}$ having a negative refractive power, a second lens group $G_{52}$ having a positive refractive power, a third lens group $G_{53}$ having a negative refractive power, and a fourth lens group $G_{54}$ having a positive refractive power. The aperture stop STP prescribing a given aperture is disposed between the first lens group $G_{51}$ and the second lens group $G_{52}$. The cover glass CG is disposed between the fourth lens group $G_{54}$ and the image plane IMG.

The first lens group $G_{51}$ is configured to include sequentially from the object side, a negative lens $L_{511}$ (first lens), a negative lens $L_{512}$ (second lens), a negative lens $L_{513}$ (third lens), a negative lens $L_{514}$, and a positive lens $L_{515}$. The negative lens $L_{514}$ and the positive lens $L_{515}$ are cemented. The material of the negative lens $L_{514}$ is EFL5 and the material of the positive lens $L_{515}$ is SNPH3.

The second lens group $G_{52}$ is configured to include sequentially from the object side, a positive lens $L_{521}$, a negative lens $L_{522}$, a positive lens $L_{523}$, a negative lens $L_{524}$, and a positive lens $L_{525}$. Both surfaces of the positive lens $L_{521}$ are aspheric. The negative lens $L_{522}$ and the positive lens $L_{523}$ are cemented. The material of the negative lens $L_{522}$ is BSC7 and the material of the positive lens $L_{523}$ is FCD1. Both surfaces of the positive lens $L_{525}$ are aspheric.

The third lens group $G_{53}$ is configured by a negative lens $L_{531}$.

The fourth lens group $G_{54}$ is configured by a positive lens $L_{541}$.

The wide angle zoom lens moves the second lens group $G_{52}$ along the optical axis, from the image plane IMG side toward the object side and moves the third lens group $G_{53}$ along the optical axis, from the object side toward the image plane IMG side and thereby, performs zooming from the wide angle end to the telephoto end. During zooming, the aperture stop STP also moves along the optical axis, from the image plane IMG side toward the object side. The wide angle zoom lens corrects the position of the image plane IMG with zooming by moving the first lens group $G_{51}$ along the optical axis, from the object side toward the image plane IMG side. The fourth lens group $G_{54}$ remains fixed and does not move during zooming.

Here, various types of data related to the wide angle zoom lens according to the fifth embodiment are given.

Focal length of entire wide angle zoom lens = 2.87 (fw: wide angle end) to 11.65 (ft: telephoto end)
F number = 1.43 (wide angle end) to 2.63 (telephoto end)
Angle of view (2ω) = 72.8 (wide angle end) to 15.4 (telephoto end)
Maximum image height (Y) = 3.21
Composite focal length of first lens group $G_{51}$ (fg1) = −9.36
Composite focal length of second lens group $G_{52}$ = 13.29
Composite focal length of third lens group $G_{53}$ = −17.82
Composite focal length of fourth lens group $G_{54}$ = 16.82
Zoom ratio = 4.06
Effective diameter of rear surface of lens farthest on image side of second lens group $G_{52}$ = 4.97
Effective diameter of front surface of lens farthest on object side of third lens group $G_{53}$ = 3.61

(Lens data)

| | | | |
|---|---|---|---|
| $r_1$ = 68.477 | $d_1$ = 1.200 | $nd_1$ = 1.7725 | $vd_1$ = 49.62 |
| $r_2$ = 9.865 | $d_2$ = 4.753 | | |
| $r_3$ = 124.938 | $d_3$ = 1.200 | $nd_2$ = 1.497 | $vd_2$ = 81.61 |
| $r_4$ = 32.867 | $d_4$ = 2.558 | | |
| $r_5$ = −21.452 | $d_5$ = 1.000 | $nd_3$ = 1.7725 | $vd_3$ = 49.62 |
| $r_6$ = 125.558 | $d_6$ = 0.101 | | |
| $r_7$ = 39.790 | $d_7$ = 1.000 | $nd_4$ = 1.58144 | $vd_4$ = 40.89 |
| $r_8$ = 23.361 | $d_8$ = 2.306 | $nd_5$ = 1.95906 | $vd_5$ = 17.47 |
| $r_9$ = 185.730 | $d_9$ = D(9) (variable) | | |
| $r_{10}$ = ∞ (aperture stop) | $d_{10}$ = D(10) (variable) | | |
| $r_{11}$ = 14.643 (aspheric) | $d_{11}$ = 4.2361 | $nd_6$ = 1.4971 | $vd_6$ = 81.56 |
| $r_{12}$ = −41.883 (aspheric) | $d_{12}$ = 0.3016 | | |
| $r_{13}$ = 48.401 | $d_{13}$ = 0.600 | $nd_7$ = 1.5168 | $vd_7$ = 64.20 |
| $r_{14}$ = 7.201 | $d_{14}$ = 5.693 | $nd_8$ = 1.497 | $vd_8$ = 81.61 |
| $r_{15}$ = −15.738 | $d_{15}$ = 0.100 | | |
| $r_{16}$ = 20.459 | $d_{16}$ = 2.234 | $nd_9$ = 1.95906 | $vd_9$ = 17.47 |
| $r_{17}$ = 11.527 | $d_{17}$ = 0.706 | | |
| $r_{18}$ = 14.941 (aspheric) | $d_{18}$ = 1.657 | $nd_{10}$ = 1.4971 | $vd_{10}$ = 81.56 |
| $r_{19}$ = −113.654 (aspheric) | $d_{19}$ = D(19) (variable) | | |
| $r_{20}$ = 109.518 | $d_{20}$ = 0.600 | $nd_{11}$ = 1.50674 | $vd_{11}$ = 74.26 |
| $r_{21}$ = 8.398 | $d_{21}$ = D(21) (variable) | | |
| $r_{22}$ = 15.130 | $d_{22}$ = 1.751 | $nd_{12}$ = 1.77254 | $vd_{12}$ = 46.32 |
| $r_{23}$ = −90.741 | $d_{23}$ = 5.000 | | |
| $r_{24}$ = ∞ | $d_{24}$ = 1.5 | $nd_{13}$ = 1.51633 | $vd_{13}$ = 64.14 |
| $r_{25}$ = ∞ | $d_{25}$ = 0.2026 | | |
| $r_{26}$ = ∞ (image plane) | | | |

Constant of the conic (ε) and aspheric coefficients (A, B, C, D, E)

(Eleventh order)

ε = 1, A = 0, B = −6.82166 × $10^{-5}$, C = −3.13462 × $10^{-6}$, D = 5.80532 × $10^{-8}$, E = −1.12451

(Twelfth order)

ε = 1, A = 0, B = 1.34112 × $10^{-4}$, C = −2.98100 × $10^{-6}$, D = 4.01217 × $10^{-8}$, E = −7.88867

(Eighteenth order)

ε = 1, A = 0, B = 2.62557 × $10^{-5}$, C = −2.47204 × $10^{-6}$, D = −2.36286 × $10^{-8}$, E = 9.02411

(Nineteenth order)

ε = 1, A = 0, B = 3.40831 × $10^{-5}$, C = −2.99033 × $10^{-6}$, D = 5.08625 × $10^{-8}$, E = −7.21980

(Zoom data)

| | Wide angle end | Telephoto end |
|---|---|---|
| D(9) | 36.543 | 1.229 |
| D(10) | 0.197 | 1.029 |
| D(19) | 0.604 | 12.789 |
| D(21) | 2.5127 | 1.3843 |

(Values related to conditional expression (1))

vmax2a = 81.61 (Abbe number for d-line of positive lens $L_{523}$)
(Values related to conditional expression (2))

vmaxg23 = 81.61 (Abbe number for d-line of negative lens $L_{512}$)
(Values related to conditional expression (3))

fg1/fw = −3.26
(Values related to conditional expression (4))

f123 = −11.31 (composite focal length of negative lens $L_{511}$, negative lens $L_{512}$, and negative lens $L_{513}$)
f123/fw = −3.94
(Values related to conditional expression (5))

f3gn = −17.92 (focal length of negative lens $L_{531}$)
ft/f3gn = −0.65
(Values related to conditional expression (6))

f3gp = 166.43 (focal length of positive lens $L_{541}$)
ft/f3gp = 0.07
(Values related to conditional expression (7))

ΔD2 = 11.057 (distance that second lens group $G_{52}$ is moved during zooming from wide angle end to telephoto end)
(ΔD2/Y) × (fw/ft) = 0.85
(Values related to conditional expression (8))

N1 = 1.7725 (refractive index for d-line of negative lens $L_{511}$)
(Values related to conditional expression (9))

f3g1 = −17.92 (focal length of negative lens $L_{531}$)
ft/f3g1 = −0.65

-continued (Values related to conditional expression (10))

ν2 = 81.61 (Abbe number for d-line of negative lens $L_{512}$)
(Values related to conditional expression (11))

ν3 = 49.62 (Abbe number for d-line of negative lens $L_{513}$)
(Values related to conditional expression (12))

Θmgf = 0.5343 (partial dispersion ratio of negative lens $L_{522}$)
Θpgf = 0.5388 (partial dispersion ratio of positive lens $L_{523}$)
νm = 64.20 (Abbe number for d-line of negative lens $L_{522}$)
νp = 81.61 (Abbe number for d-line of positive lens $L_{523}$)
(Θmgf − Θpgf)/(νm − νp) = 0.000258
(Values related to conditional expression (13))

N3gn = 1.50674 (refractive index for d-line of negative lens $L_{531}$)
(Values related to conditional expression (14))

ν3gn = 74.26 (Abbe number for d-line of negative lens $L_{531}$)
(Values related to conditional expression (15))

tanωW × (ft/fw) = 13.12
(Values related to conditional expression (16))

L/fw = 27.04

FIG. 10 is a diagram of various types of aberration occurring in the wide angle zoom lens according to the fifth embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

Among the values for each of the embodiments, $r_2$, . . . indicate the radius of curvature of lens surfaces, aperture surface, etc.; $d_1$, $d_2$, . . . indicate the thickness of the lenses, the aperture, etc. or the interval between the surfaces thereof; $nd_1$, $nd_2$, . . . indicate the refractive index of the lenses with respect to the d-line (λ=587.56 nm); and $υd_1$, $υd_2$, . . . indicate the Abbe number for the d-line (λ=587.56 nm) of the lenses. Lengths are indicated in units of "mm"; and angles are indicated in "degrees".

Each aspheric surface shape above is expressed by the equation below; where, H is the height along a direction orthogonal to the optical axis; x is displacement along the direction of the optical axis, at H when the apex of the lens surface is regarded as the origin; R is paraxial radius of curvature; c is the constant of the conic; A, B, C, D, E are respectively second order, fourth order, sixth order, eighth order, and tenth order aspheric coefficients; and the travel direction of light is assumed to be positive.

$$x = \frac{H^2/R}{1+\sqrt{1-(\varepsilon H^2/R^2)}} + AH^2 + BH^4 + CH^6 + DH^8 + EH^{10} \quad [1]$$

As illustrated by each of the embodiments above, according to the present invention, satisfying the conditional expressions above enables a wide angle zoom lens to be realized that can capture images in not only the visible light region but also the near-infrared light region, has a high zoom ratio (about 4 times), a large aperture, and high resolution. The wide angle zoom lens has a short overall length and, chromatic aberration and peripheral resolution performance are particularly favorable. The wide angle zoom lens disposes cemented lenses and/or lenses having proper aspheric surfaces thereby, enabling better resolution.

As described, the wide angle zoom lens according to the present invention is useful with respect to imaging apparatuses equipped with a solid-state image sensing device such as a CCD, C-MOS, etc. and is particularly suitable for imaging apparatuses that also have to capture images at night.

According to the present invention, an effect is achieved in that a wide angle zoom lens having a simple configuration and enabling a high zoom ratio, bright images, and high resolution can be provided. In addition, a wide angle zoom lens having a short overall length and, favorable chromatic aberration correction and peripheral resolution performance can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application is based upon and claims the benefit of priority of the prior Japanese Patent Application No. 2014-223556, filed on Oct. 31, 2014, the entire contents of which are incorporated herein by reference.

What is claimed is:

1. A wide angle zoom lens comprising sequentially from an object side:
   a first lens group having a negative refractive power overall and three lenses, including a first lens, a second lens, and a third lens, successively disposed farthest on the object side and each of the three lenses having a negative refractive power;
   a second lens group having a positive refractive power overall and one or more sets of cemented lenses; and
   a third lens group, wherein
   the wide angle zoom lens zooms from a wide angle end to a telephoto end by varying intervals between the first lens group, the second lens group, and the third lens group on the optical axis, and
   the wide angle zoom lens satisfies a conditional expression (1) 70≤υmax2a≤99 and a conditional expression (2) 70≤υmaxg23≤99, where υmax2a represents an Abbe number of a lens that among the one or more sets of cemented lenses included in the second lens group, has least dispersion, and υmaxg23 represents an Abbe number of a lens that among the second lens and the third lens included in the first lens group, has lesser dispersion,
   one or more positive lenses are disposed in or subsequent to the third lens group, and
   the wide angle zoom lens satisfies a conditional expression (6) 0≤ft/f3gp≤0.33, where f3gp represents a focal length of a positive lens having a strongest refractive power among the one or more positive lenses disposed in or subsequent to the third lens group and ft represents an optical system focal length at the telephoto end.

2. A wide angle zoom lens comprising sequentially from an object side:
   a first lens group having a negative refractive power overall and three lenses, including a first lens, a second lens, and a third lens, successively disposed farthest on the object side and each of the three lenses having a negative refractive power;

a second lens group having a positive refractive power overall and one or more sets of cemented lenses; and a third lens group, wherein the wide angle zoom lens zooms from a wide angle end to a telephoto end by varying intervals between the first lens group, the second lens group, and the third lens group on the optical axis, and the wide angle zoom lens satisfies a conditional expression (1) $70 \leq \upsilon max2a \leq 99$ and a conditional expression (3) $-10 \leq fg1/fw \leq -2.4$, where $\upsilon max2a$ represents an Abbe number of a lens that among the one or more sets of cemented lenses included in the second lens group, has least dispersion, fg1 represents a composite focal length of the first lens group, and fw represents an optical system focal length at the wide angle end.

3. The wide angle zoom lens according to claim 1, wherein the wide angle zoom lens satisfies a conditional expression (4) $-6 \leq f123/fw \leq -1$, where f123 represents a composite focal length of the first lens, the second lens, and the third lens included in the first lens group and fw represents an optical system focal length at the wide angle end.

4. The wide angle zoom lens according to claim 1, wherein the third lens group includes a sole negative lens, and the wide angle zoom lens satisfies a conditional expression (5) $-0.73 \leq ft/f3gn \leq -0.22$, where f3gn represents a focal length of the sole negative lens of the third lens group and ft represents the optical system focal length at the telephoto end.

5. The wide angle zoom lens according to claim 1, wherein the wide angle zoom lens satisfies a conditional expression (7) $0.5 \leq (\Delta D2/Y) \times (fw/ft) \leq 2.9$, where $\Delta D2$ represents a distance that the second lens group is moved during zooming from the wide angle end to the telephoto end, Y represents a maximum image height, fw represents an optical system focal length at the wide angle end, and ft represents the optical system focal length at the telephoto end.

6. The wide angle zoom lens according to claim 1, wherein the wide angle zoom lens satisfies a conditional expression (8) $1.70 \leq N1 \leq 2.1$, where N1 represents a refractive index corresponding to d-line of the first lens included in the first lens group.

7. The wide angle zoom lens according to claim 2, wherein the wide angle zoom lens satisfies a conditional expression (4) $-6 \leq f123/fw \leq -1$, where f123 represents a composite focal length of the first lens, the second lens, and the third lens included in the first lens group and fw represents the optical system focal length at the wide angle end.

8. The wide angle zoom lens according to claim 2, wherein the third lens group includes a sole negative lens, and the wide angle zoom lens satisfies a conditional expression (5) $-0.73 \leq ft/f3gn \leq -0.22$, where f3gn represents a focal length of the sole negative lens of the third lens group and ft represents the optical system focal length at the telephoto end.

9. The wide angle zoom lens according to claim 2, wherein one or more positive lenses are disposed in or subsequent to the third lens group, and the wide angle zoom lens satisfies a conditional expression (6) $0 \leq ft/f3gp \leq 0.33$, where f3gp represents a focal length of a positive lens having a strongest refractive power among the one or more positive lenses disposed in or subsequent to the third lens group and ft represents the optical system focal length at the telephoto end.

10. The wide angle zoom lens according to claim 2, wherein the wide angle zoom lens satisfies a conditional expression (7) $0.5 \leq (\Delta D2/Y) \times (fw/ft) \leq 2.9$, where $\Delta D2$ represents a distance that the second lens group is moved during zooming from the wide angle end to the telephoto end, Y represents a maximum image height, fw represents the optical system focal length at the wide angle end, and ft represents the optical system focal length at the telephoto end.

11. The wide angle zoom lens according to claim 2, wherein the wide angle zoom lens satisfies a conditional expression (8) $1.70 \leq N1 \leq 2.1$, where N1 represents a refractive index corresponding to d-line of the first lens included in the first lens group.

* * * * *